United States Patent
Yuzuta et al.

(10) Patent No.: US 12,225,172 B2
(45) Date of Patent: Feb. 11, 2025

(54) IMAGE PROCESSING APPARATUS, IMAGE PROCESSING METHOD, AND STORAGE MEDIUM TO REDUCE INK APPLICATION AMOUNT

(71) Applicant: CANON KABUSHIKI KAISHA, Tokyo (JP)

(72) Inventors: Misae Yuzuta, Kanagawa (JP); Toshiki Miyazaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/365,825

(22) Filed: Aug. 4, 2023

(65) Prior Publication Data

US 2024/0056544 A1 Feb. 15, 2024

(30) Foreign Application Priority Data

Aug. 10, 2022 (JP) ................. 2022-127573

(51) Int. Cl.
*H04N 1/60* (2006.01)
*H04N 1/54* (2006.01)

(52) U.S. Cl.
CPC ............ *H04N 1/6022* (2013.01); *H04N 1/54* (2013.01)

(58) Field of Classification Search
CPC ..... H04N 1/52; H04N 1/54; H04N 1/60–6097
See application file for complete search history.

(56) References Cited

U.S. PATENT DOCUMENTS

| | | |
|---|---|---|
| 2012/0230584 A1 | 9/2012 | Kubo et al. |
| 2022/0250394 A1* | 8/2022 | Mizoguchi ............... H04N 1/54 |

FOREIGN PATENT DOCUMENTS

JP 2012186711 A 9/2012

* cited by examiner

*Primary Examiner* — Barbara D Reinier
(74) *Attorney, Agent, or Firm* — Canon U.S.A., Inc. I.P. Division

(57) ABSTRACT

An image processing apparatus acquires, with respect to a pixel of interest, a combination of a plurality of pixel values representing respective ink application amounts of a plurality of color inks including at least one basic color ink and a fluorescent ink containing a dispersion element having a fluorescent property, determines whether a total value of the plurality of pixel values is larger than a threshold value, and, in a case where it is determined that the total value is larger than the threshold value, reduces a pixel value for at least one ink of the at least one basic color ink in such a manner that an amount by which to reduce a pixel value for the fluorescent ink becomes smaller than an amount by which to reduce a pixel value corresponding to at least one ink of the at least one basic color ink.

18 Claims, 21 Drawing Sheets

FIG.2
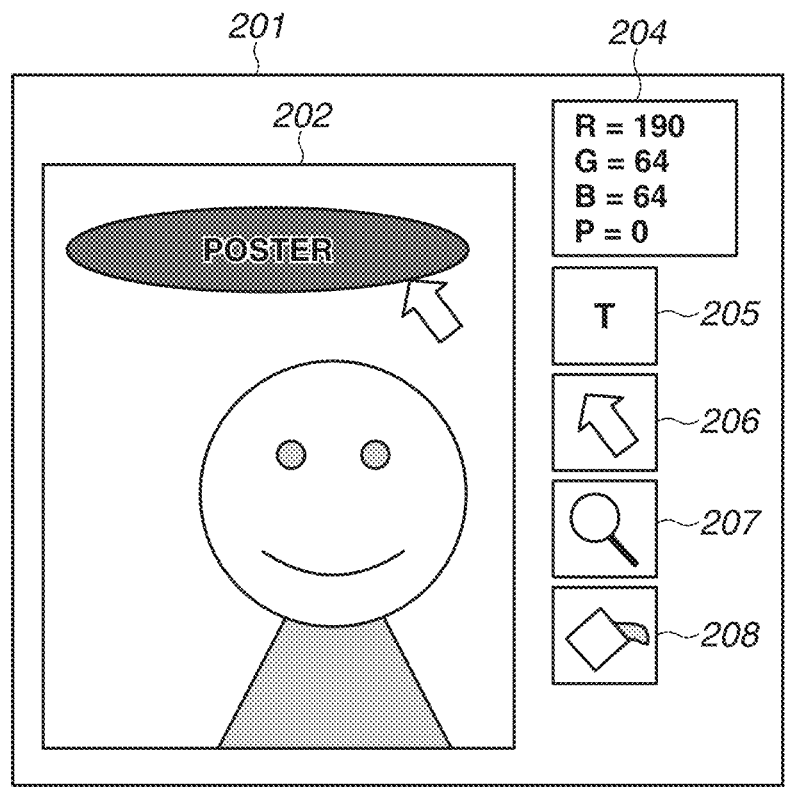
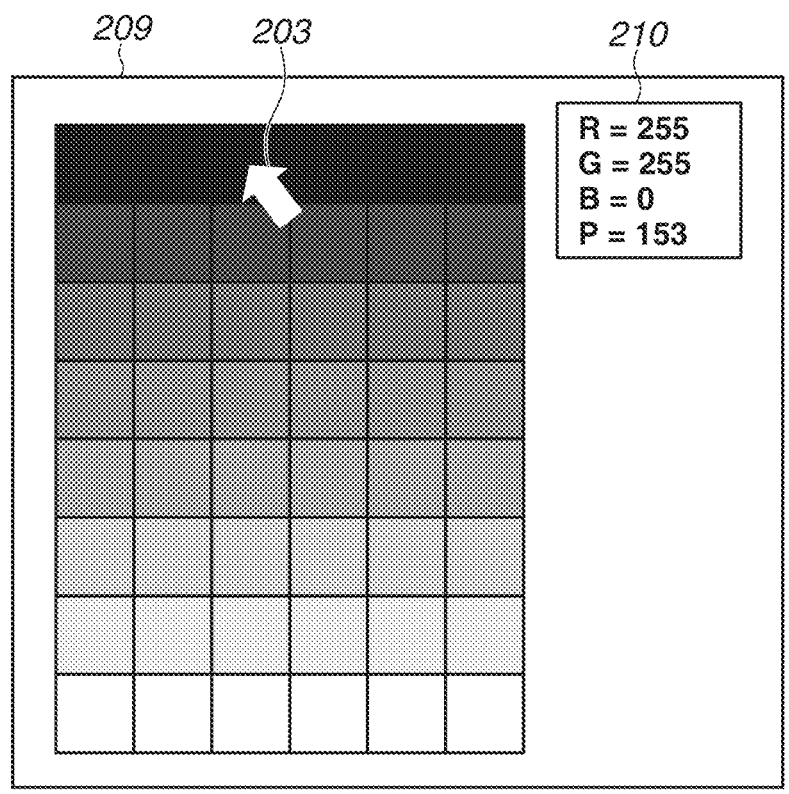

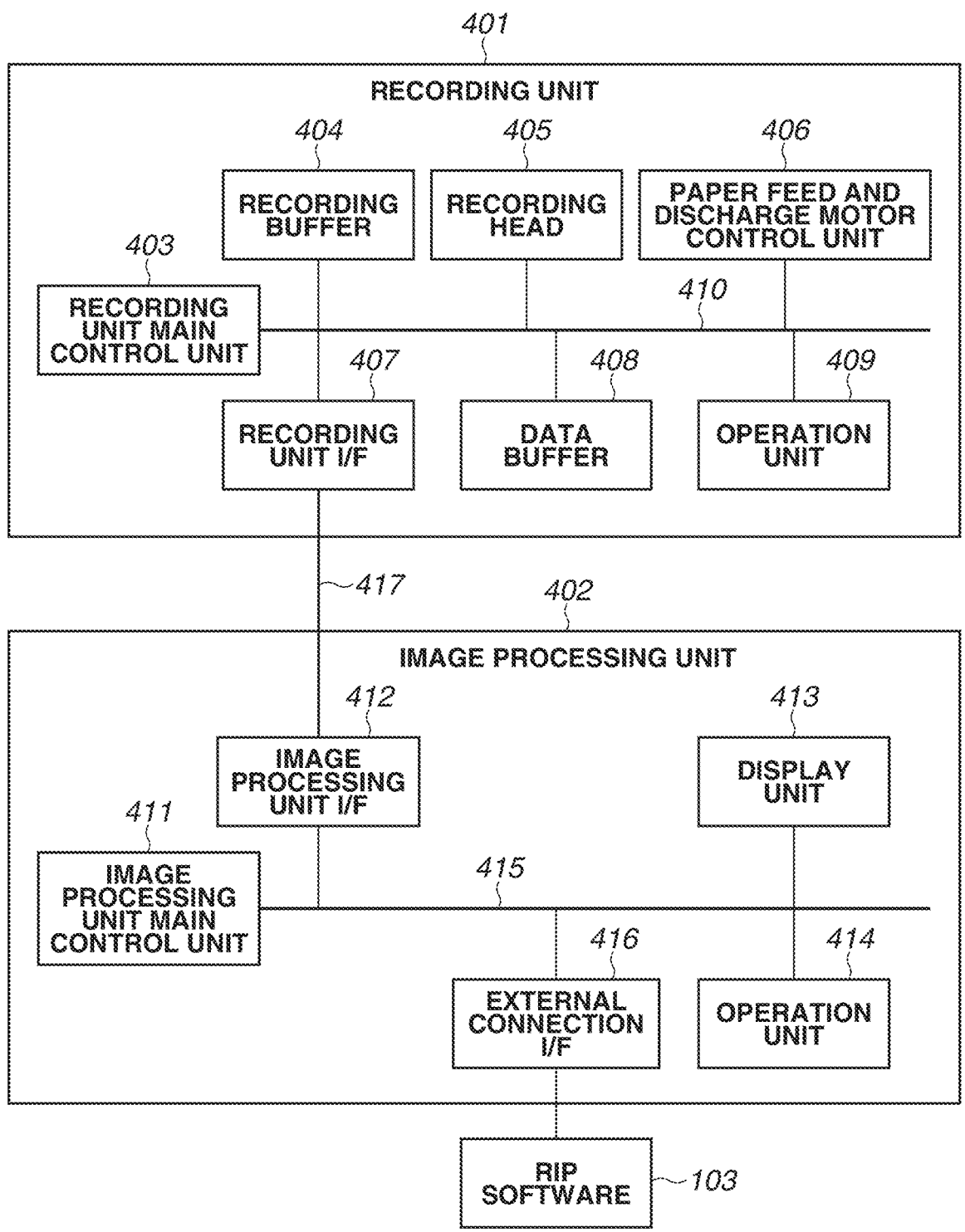

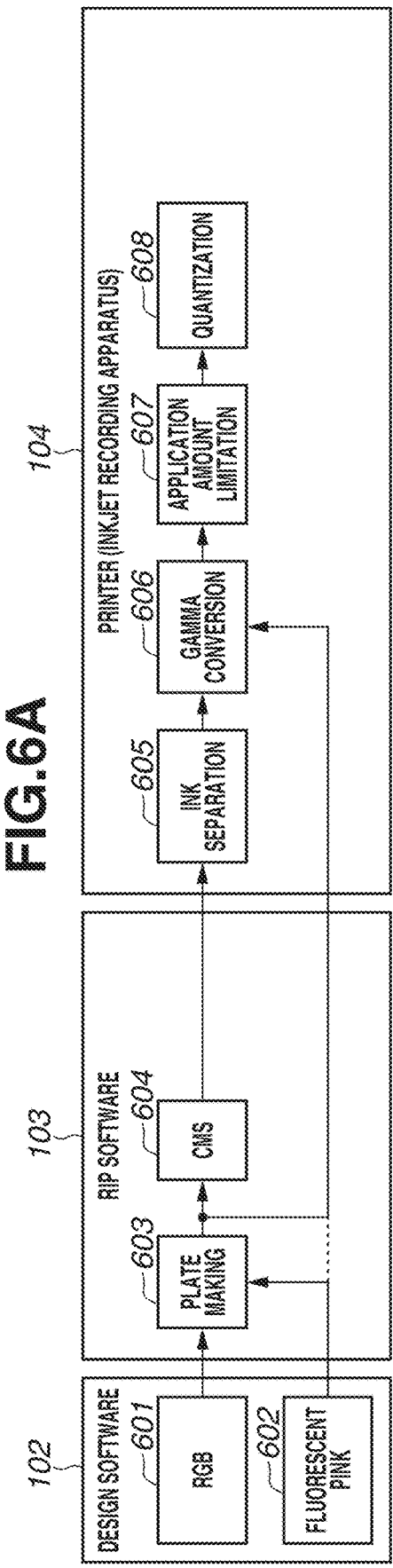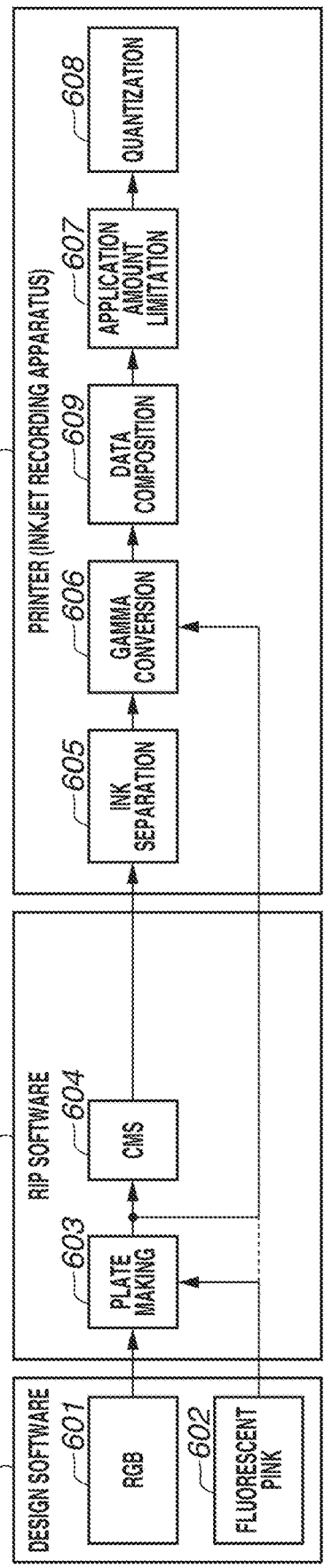

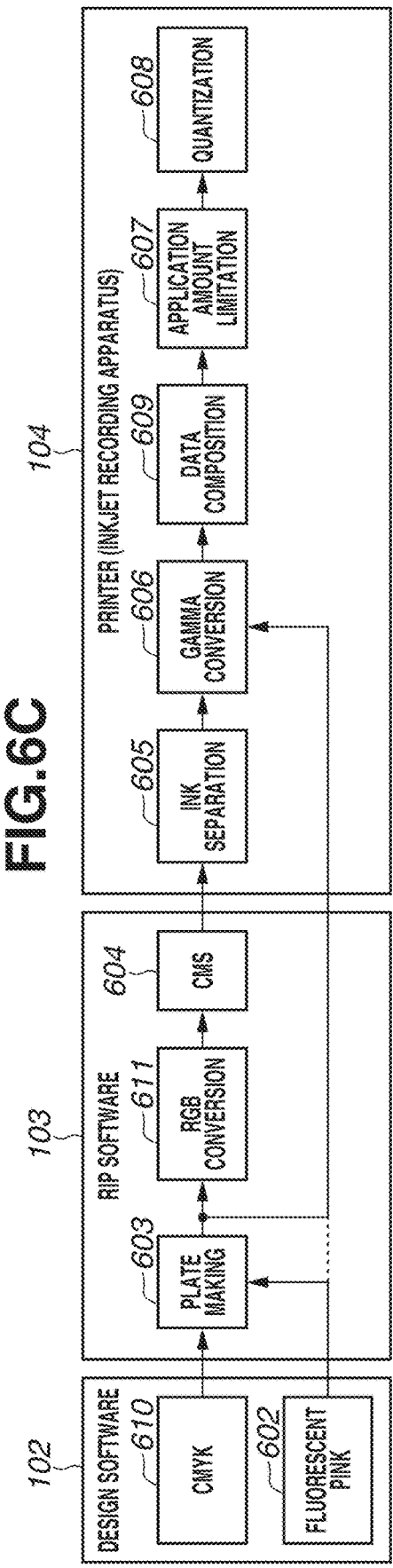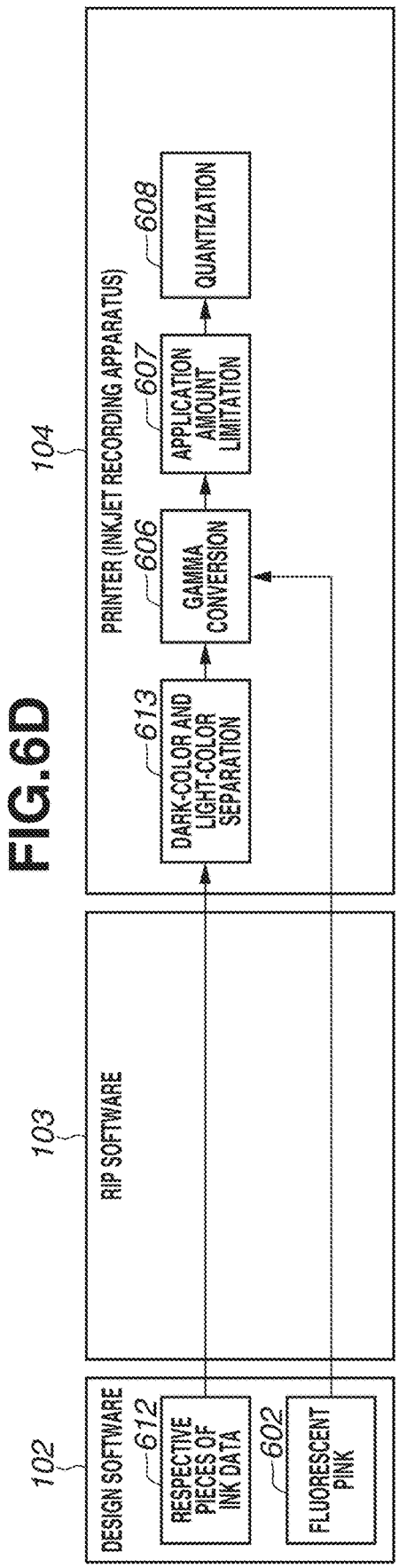

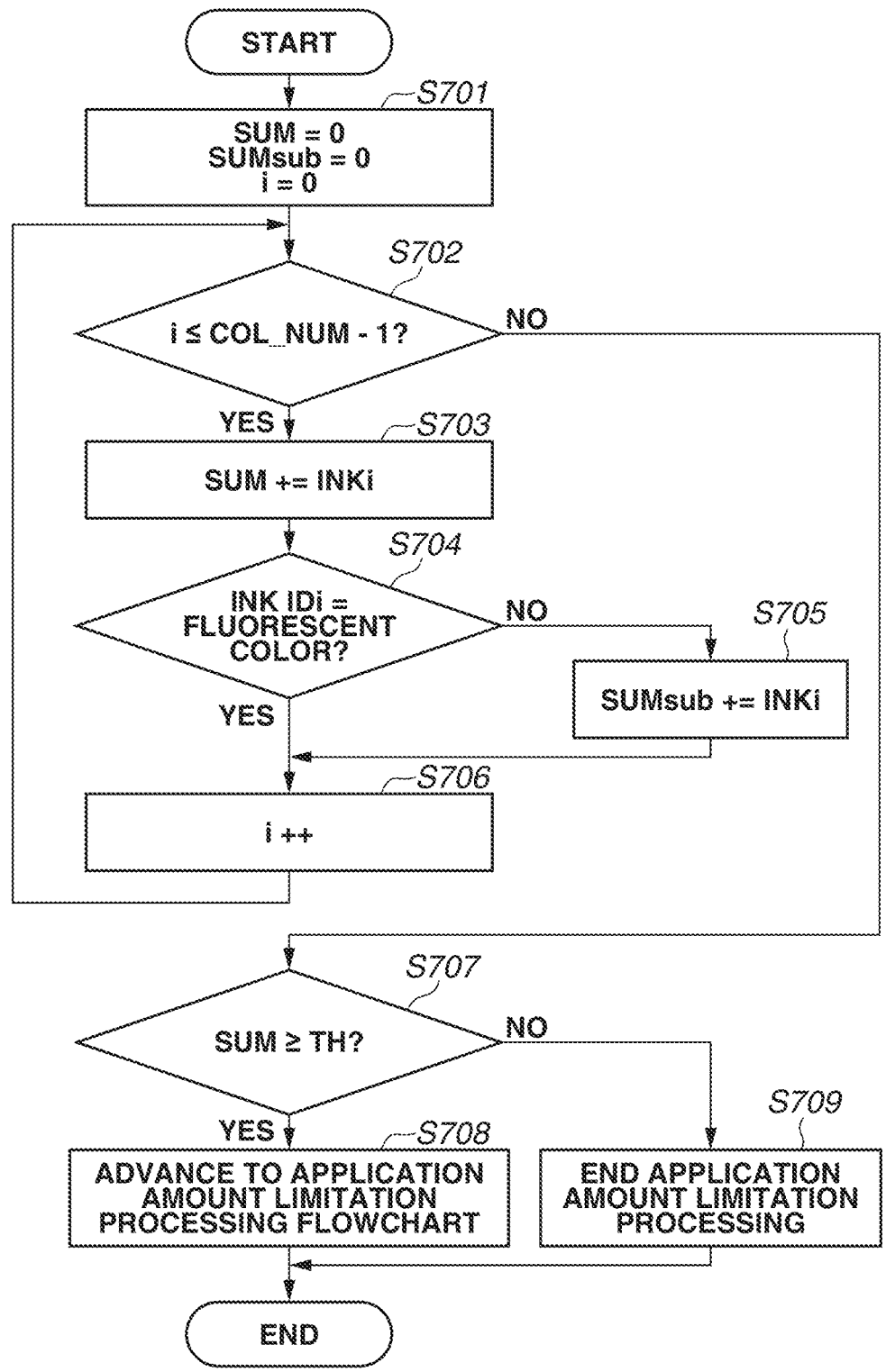

FIG.8

| INK ID | INK NAME | APPLICATION AMOUNT | FLUORESCENT INK DETERMINATION | PRIORITY ORDER FOR REDUCTION |
|---|---|---|---|---|
| 0 | CYAN INK | 250 | FALSE | 1 |
| 1 | MAGENTA INK | 160 | FALSE | 2 |
| 2 | YELLOW INK | 170 | FALSE | 3 |
| 3 | BLACK INK | 180 | FALSE | 0 |
| 4 | FLUORESCENT PINK INK | 300 | TRUE | 4 |

FIG.17

| RANKING IN ASCENDING ORDER OF APPLICATION AMOUNT | INK ID |
|---|---|
| 0 | 1 |
| 1 | 2 |
| 2 | 3 |
| 3 | 0 |
| 4 | 4 |

IMAGE PROCESSING APPARATUS, IMAGE PROCESSING METHOD, AND STORAGE MEDIUM TO REDUCE INK APPLICATION AMOUNT

BACKGROUND

Field

The present disclosure generally relates to image processing and, more particularly, to an image processing apparatus, an image processing method, and a storage medium for recording an image on a recording medium.

Description of the Related Art

Recently, users who use printers each serving as a recording apparatus have been increasingly subdivided. Users with higher proficiency levels for recording apparatuses may perform an operation for recording a test patch on a recording medium and adjusting an ink application amount (the amount of application of ink) by themselves. On the other hand, with respect to users with lower proficiency levels, a conversion table with adjusted ink application amounts written therein may be provided from a printer vendor which has comprehended characteristic features of a recording apparatus and ink. With the use of such a conversion table, users with lower proficiency levels are able to adjust coloration within the range of an ink application amount in such a way as to prevent the ink application amount on a recording medium from becoming too large.

In the case of a conversion table being used, the ratio between inks for a secondary color image which is reproduced with use of a plurality of color inks is naturally selected from within a range provided by the printer vendor. On the other hand, desires to set the application amount of each color ink at a ratio different from the ink ratio provided by the conversion table have been increasing.

US2012/0230584 discusses, to reduce a design load for a look-up table, calculating a total value of ink application amounts and limiting the application amount of each ink in such a manner that the total value becomes less than or equal to a previously set limit value.

SUMMARY

According to some embodiments, an image processing apparatus includes an acquisition unit configured to acquire, with respect to a pixel of interest, a combination of a plurality of pixel values representing respective ink application amounts of a plurality of color inks including at least one basic color ink and a fluorescent ink containing a dispersion element having a fluorescent property, a determination unit configured to determine whether a total value of the plurality of pixel values is larger than a threshold value, and a reduction unit configured to, in a case where it is determined by the determination unit that the total value is larger than the threshold value, reduce a pixel value for at least one ink of the at least one basic color ink in such a manner that an amount by which to reduce a pixel value for the fluorescent ink becomes smaller than an amount by which to reduce a pixel value corresponding to at least one ink of the at least one basic color ink.

Further features of the present disclosure will become apparent from the following description of exemplary embodiments with reference to the attached drawings.

BRIEF DESCRIPTION OF THE DRAWINGS

FIG. 2 is a diagram illustrating, by way of example, user interface (UI) information about design software.

FIG. 4 is a block diagram illustrating a configuration of control of an inkjet recording system.

FIGS. 6A, 6B, 6C, and 6D are diagrams illustrating examples of respective processing configurations of the recording system.

FIG. 7 is a flowchart of application amount excess determination processing in a first exemplary embodiment.

FIG. 8 is a table showing a correspondence relationship between an ink identification (ID), an ink name, and an application amount for a given pixel.

FIG. 17 is a table showing a correspondence relationship between a rank order in ascending order of application amount and a corresponding ink ID for a given pixel.

DESCRIPTION OF THE EMBODIMENTS

Various exemplary embodiments, features, and aspects of the disclosure will be described in detail below with reference to the drawings.

Figure 1:
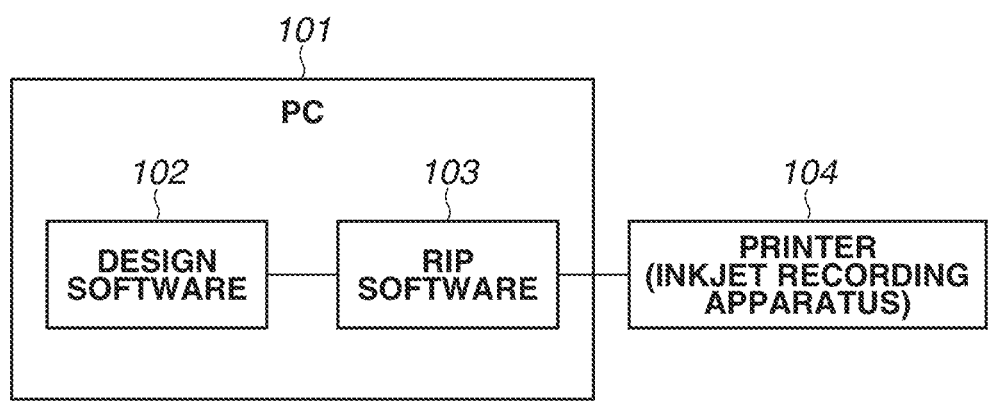
FIG. 1 is a diagram illustrating an example of an overall outline of a recording system.

FIG. 1 illustrates an example of a recording system which is applicable to a first exemplary embodiment. An inkjet recording apparatus (printer) 104, which functions as an image processing apparatus, is connected to a personal computer (PC) 101. The PC 101 is able to run design software 102 to edit image data which is to be recorded by the inkjet recording apparatus 104. Image data created by the design software 102 is transferred to raster image processor (RIP) software 103. The RIP software 103 performs plate making processing and color management processing.

While FIG. 1 illustrates an example in which the design software 102 and the RIP software 103 are run in the PC 101, a configuration in which the design software 102 and the RIP software 103 are run in another PC can be employed. In many cases, a user who creates or edits image data may differ from a user who performs editing for recording on a recording medium. In such cases, RIP software or print processing is executed in a PC located in a printing business. The design software 102 can be, for example, Adobe Illustrator or specific model-directed dedicated software and is not limited in software. The design software 102 and the RIP software 103 can be configured to be integrated with each other. Moreover, the RIP software 103 can be configured to be built in the inkjet recording apparatus 104. Various communication configurations such as Universal Serial Bus (USB) and Gigabit Ethernet, each of which is wired, and Wi-Fi, which is wireless, can be applied to between the PC 101 and the inkjet recording apparatus 104. Furthermore, communication configurations affect the productivity of a printer and are, therefore, desirable to be selectable according to the productivity of a printer which the user expects.

FIG. 2 illustrates examples of a user interface (UI) of the design software 102. In FIG. 2, a screen 201 represents the whole of a screen for editing image data. In a display screen 202, image data targeted for editing is displayed. The image data includes, besides signal values for red (R), green (G), and blue (B), a signal value for fluorescent pink (P). In FIG. 2, a layer of (R, G, B, P) in which the face of a person is drawn and a layer of (R, G, B, P) for a balloon in which text "POSTER" is written are included in the display screen 202. A pointer 203 is operated on a window by the user handling a mouse to perform editing with the design software 102. Pixel values 204 indicate pixel values of data obtained at a location pointed by the pointer 203. In the example illustrated in FIG. 2, the pointer 203 is pointing a balloon in which text "POSTER" is written on the display screen 202. Pixel values at the balloon are signal values (190, 64, 64, 0) for (R, G, B, P).

A text editing button 205 is a button used to superpose text data on image data at the time of design software editing, and is able to be used to, for example, add text "POSTER" on the display screen 202 or change the content of text. A mouse changing button 206 is a button used to change the pointer 203 to another pointer, and is able to be used to change the pointer 203 to a rectangular frame for designating the area of the entire balloon. A scaling button 207 is a button used to enlarge or reduce information displayed on the display screen 202. A color changing button 208 is a button used to change pixel value information about data obtained at a location which is pointed by the pointer 203. When the color changing button 208 is pressed, screen transition is performed or a swatch screen 209 is displayed as another screen.

When the pointer 203 is operated to designate a patch from within the swatch, pixel values 210 corresponding to the designated patch are displayed. In FIG. 2, signal values for (R, G, B, P) of the patch pointed by the pointer 203 are (255, 255, 0, 153).

Furthermore, pixel signal information which is obtained as the pixel values 204 and the pixel values 210 is not limited to (R, G, B, P). For example, the pixel signal information can be a color signal containing respective elements of (C, M, Y, K, P). Moreover, the pixel signal information can be a color signal containing respective elements of (C, Lc, M, Lm, Y, Ly, K, Lk, P). In the case of information which is none of R, G, and B, a given pixel value may be associated with a density on a recording medium. While patches of the swatch illustrated in FIG. 2 represent cross patches configured such that signal values for P (fluorescent pink) vary along the horizontal axis and respective signal values for R, G, and B vary along the vertical axis, the first exemplary embodiment is not limited to such a patch displaying method. With regard to pixel value information represented by the signal values 210, the user himself or herself can manually set designated values. In a case where the use frequency of pixel values which the user manually sets is high, such pixel values can be preset in the swatch.

While, as a method for the user to designate the density of fluorescent pink, the above-mentioned mode of expression using the swatch can be used, a method of directly designating numerical values can also be used.

The design software 102 transmits the created image data to the RIP software 103. In the example illustrated in FIG. 2, the created image data contains data for four colors R, G, B, and P. Moreover, the design software 102 is able to break down one piece of image data into respective contents such as a person and a background and bring the respective contents into a superposed state. The respective contents contain data for four colors and are brought into a state in which layers of image data called layers are superposed on each other. An area in which "POSTER" is written on the display screen 202 is assumed to be superposed on a background for the shown face of a person. In this case, image data representing the shown face of a person and image data representing the written "POSTER" are sent to the RIP software 103. The RIP software 103 performs plate making on the received plurality of pieces of image data and then transfers, to the inkjet recording apparatus 104, image data for one piece converted into channels corresponding to the respective colors described below with reference to FIGS. 6A, 6B, 6C, and 6D.

Figure 3:
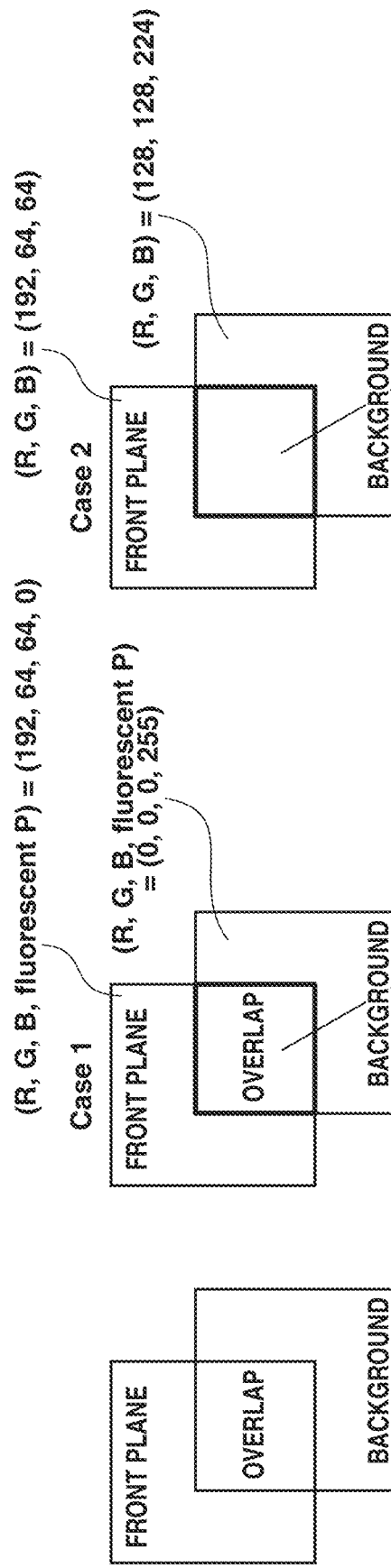
FIG. 3 is a diagram illustrating an example of plate making processing which is performed by raster image processor (RIP) software.

FIG. 3 illustrates an example of plate making to be performed on data input to the RIP software 103. Plate making processing is performed to generate, from a plurality of layers, image data composed of channels of (R, G, B, P). This plate making processing is considered to mainly include three processing operations for "knockout", "overprint", and "multiplication". In FIG. 3, practical examples of plate making processing are illustrated in two Cases. In Case 1, R, G, and B data and fluorescent pink data are set as inputs. In Case 2, two types of R, G, and B data are set as inputs in such a way as to make a change of an implementation unit for plate making processing easily understandable.

Knockout prioritizes front plane data in all of the pieces of image data with respect to overlap. In Case 1, when the signal value of fluorescent pink data in the front plane is "0", even if the signal value of fluorescent pink data in the background is "255", the signal value of fluorescent pink data in the overlap region is output as "0". The purpose for which the user desires knockout is, for example, a case where the user wants to make front plane data viewable.

Overprint, while prioritizing front plane data with respect to overlap, employs background data in a case where the signal value of an image of the front plane data is "0". In Case 1, since the signal value of fluorescent pink data in the front plane is "0", overprint employs the signal value "255" of fluorescent pink data in the background as an output value of fluorescent pink data in the overlap region. The purpose for which the user desires overprint is, for example, a case where the user wants to prevent or reduce plate misregistration.

Multiplication employs the signal values of front plane data and background data with respect to overlap with use of a determined calculation formula. The calculation formula differs depending on software. For example, output results shown in FIG. 3 are those calculated with use of the following formula (1):

$$\text{Output signal value} = (1 \times \text{front plane data}) \times (1 \times \text{background data})/255 \quad (1).$$

The purpose for which the user desires multiplication is, for example, a case where the user wants to obtain a watermark effect.

In overprint or multiplication, there is an intention that the user wants to take advantage of background data without overwriting the background data with front plane data. For example, overprint or multiplication is effective for a case where the user wants to obtain not only gradation characteristics of color ink but also a luminous effect of fluorescent pink ink which is output in conformity with the signal value of fluorescent pink data.

FIG. 4 is a block diagram illustrating an example of a configuration of the inkjet recording apparatus 104, which, in the first exemplary embodiment, is configured with a recording unit 401 and an image processing unit 402. Image data supplied from the RIP software 103 is subjected to predetermined image processing by the image processing unit 402 and is then sent to the recording unit 401. Then, ink is applied from the recording unit 401 to a recording medium based on the image data, so that an image is recorded on the recording medium.

In the recording unit 401, a recording unit main control unit 403, which is configured with, for example, a central processing unit (CPU), a read-only memory (ROM), and a random access memory (RAM), controls the entirety of the recording unit 401. Moreover, the recording unit main control unit 403 can be configured to allow the CPU to cause a hardware circuit such as an application specific integrated circuit (ASIC) to operate or can include an ASIC. A recording buffer 404 is able to store, as raster data, image data which is to be transferred to a recording head 405.

The recording head 405 is an inkjet type recording head provided with a plurality of nozzles capable of ejecting ink as droplets. Ink is ejected from each nozzle based on image data stored in the recording buffer 404. The recording head 405 in the first exemplary embodiment is capable of ejecting color inks for basic colors, i.e., cyan (C), magenta (M), yellow (Y), and black (K), and special color ink for fluorescent pink (P). In the recording head 405, five nozzle arrays corresponding to respective inks for such a total of five colors are arranged. Furthermore, the number of ink colors is not limited to this, and the colors of basic color inks are not limited to the above-mentioned colors. For example, there can be further provided nozzle arrays for ejecting some of light cyan ink, light magenta ink, gray ink, and light gray ink as basic color inks. Moreover, there can be further provided nozzle arrays for ejecting some of red ink, green ink, and blue ink as special color inks. Moreover, there can be further provided a nozzle array for ejecting ink for fluorescent yellow as a fluorescent color ink. Moreover, there can be further provided nozzle arrays for ejecting some of silver ink, emboss ink, and clear ink, each of which has a function other than the function of reproducing color on a recording medium. Moreover, there can be further provided a nozzle array for ejecting, instead of fluorescent pink ink, metallic ink containing metallic particles.

A paper feed and discharge motor control unit 406 controls conveyance, feeding, and discharging of a recording medium. The paper feed and discharge motor control unit 406 controls the position of a recording medium in such a way as to cause ink ejected from the recording head 405 to land at a correct position. Moreover, in consideration of a case where the recording head 405 is a recording head for recording an image with a multipass recording method, the paper feed and discharge motor control unit 406 performs motor starting and stopping operations.

A recording unit interface (I/F) 407 performs transmission and reception of data signals with the image processing unit 402, and an I/F signal line 417 is used to interconnect the recording unit I/F 407 and the image processing unit 402. The applicable types of I/F signal line 417 include, for example, a signal line that is based on specifications of Centronics Data Computer Corporation. A data buffer 408 temporarily stores image data received from the image processing unit 402. An operation unit 409 includes a mechanism used for developers to perform command operations. A system bus 410 interconnects respective functions of the recording unit 401.

On the other hand, in the image processing unit 402, an image processing unit main control unit 411, which includes, for example, a CPU, a ROM, and a RAM, performs various processing operations on an image supplied from the RIP software 103 to generate image data which is able to be recorded by the recording unit 401. Moreover, since the CPU as part of a control unit can cause a hardware circuit such as an ASIC to operate, the image processing unit main control unit 411 can include an ASIC. A look-up table and a matrix to be used are preliminarily recorded on the ROM included in the image processing unit main control unit 411 for each type of recording medium and each recording mode. An image processing unit interface (I/F) 412 performs transmission and reception of data signals with the recording unit 401. An external connection interface (I/F) 416 performs transmission and reception of, for example, image data with the RIP software 103 connected via the I/F signal line 417. A display unit 413 displays various pieces of information to the user, and, for example, a liquid crystal display (LCD) can be applied as the display unit 413. An operation unit 414 is a mechanism used for users to perform command operations, and, for example, a keyboard and a mouse can be applied as the operation unit 414. A system bus 415 interconnects the image processing unit main control unit 411 and various functions.

Figure 5A:
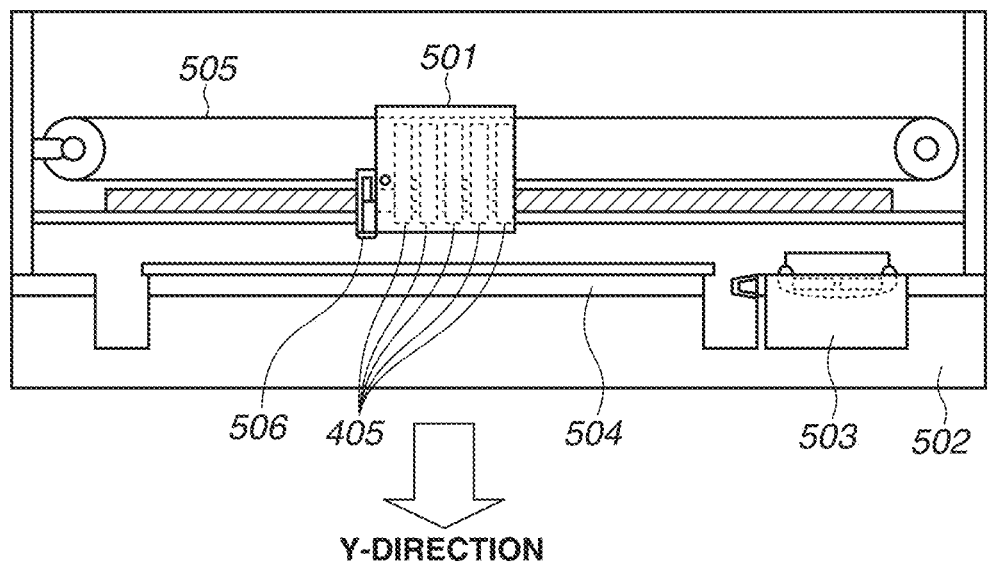
FIGS. 5A and 5B are sectional side views used to explain a configuration of a recording unit of an inkjet recording apparatus.
Figure 5B:
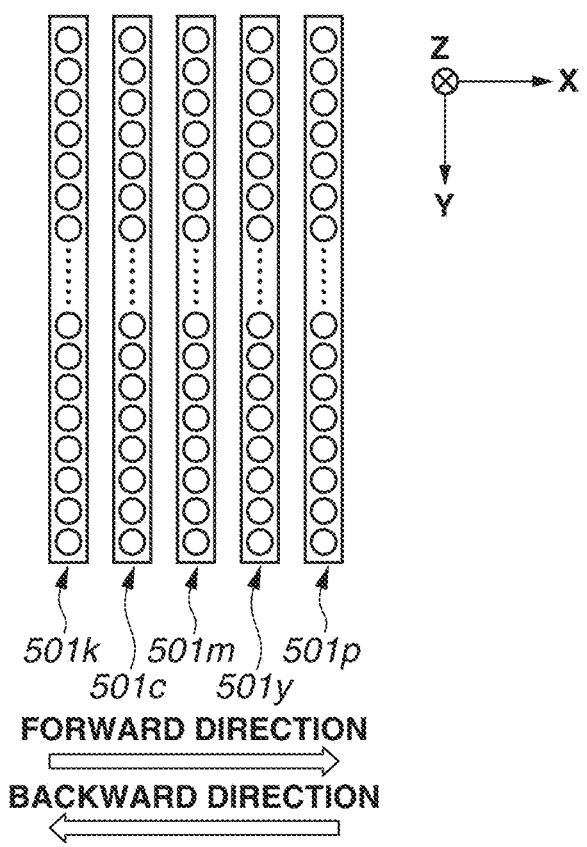

FIGS. 5A and 5B are diagrams used to explain a configuration of the inkjet recording apparatus 104. FIG. 5A is a sectional side view of the inkjet recording apparatus 104. A carriage 501 on which a recording head 405 provided with nozzle arrays the number of which corresponds to the number of ink colors and an optical sensor 506 are mounted reciprocates along the X-direction illustrated in FIG. 5A by driving force of a carriage motor transmitted via a belt 505. When the carriage 501 is relatively moving in the X-direction with respect to a recording medium, ink droplets are ejected in the Z-direction from the respective nozzles provided in the recording head 405 according to recording data. This ejection operation causes ink to be applied to a recording medium placed on a platen 504, so that an image for one scanning is recorded. When one recording scanning is finished, a conveyance operation by an amount corresponding to the recording width of an image for one scanning is performed in the Y-direction (conveyance direction) intersecting with the X-direction illustrated in FIG. 5A. Repeating such recording scanning and conveyance operation alternately a plurality of times causes an image to be formed on a recording medium.

The optical sensor 506 performs a detection operation while moving together with the carriage 501 to detect whether a recording medium is present on the platen 504. A recovery unit 503 for performing maintenance processing on the recording head 405 is arranged in a scanning area of the carriage 501 at a position away from the surface of the platen 504.

FIG. 5B is a diagram illustrating the arrangement of nozzle arrays in a case where the recording head 405 mounted on the carriage 501 is viewed from the upper surface of the inkjet recording apparatus 104 (from the −Z-direction). In the recording head 405, five nozzle arrays are arranged in such a manner that the respective positions of the five nozzle arrays differ in the X-direction. As mentioned above, the five nozzle arrays are a nozzle array 501c corresponding to cyan ink, a nozzle array 501m corresponding to magenta ink, a nozzle array 501y corresponding to yellow ink, a nozzle array 501k corresponding to black ink, and a nozzle array 501p corresponding to fluorescent pink ink. C ink is ejected from nozzles of the nozzle array 501c. M ink is ejected from nozzles of the nozzle array 501m. Y ink is ejected from nozzles of the nozzle array 501y. K ink is ejected from nozzles of the nozzle array 501k. Fluorescent pink ink is ejected from nozzles of the nozzle array 501p. In each nozzle array, a plurality of nozzles for ejecting ink as droplets is arrayed at a predetermined pitch along the Y-direction.

While, in FIGS. 5A and 5B, a configuration in which the carriage 501 with the recording head 405 mounted thereon moves along the X-direction is assumed, the first exemplary embodiment is not limited to this configuration, as long as the relative movement of the recording head 405 allows an image to be recorded on a recording medium. For example, a recording head of what is called a full multiple recording type, which uses a recording head provided with a nozzle array having a length exceeding the recording medium width in the X-direction and performs recording by applying ink to a recording medium which is conveyed in the Y-direction, can be employed.

Here, fluorescent ink which is used in the first exemplary embodiment is described. In the first exemplary embodiment, fluorescent ink produced by mixing a dispersion element having fluorescent property, a solvent, and an activator is used. The fluorescent dispersion element for use in fluorescent ink in the first exemplary embodiment is a dispersion element having fluorescent property. For example, the fluorescent dispersion element is NKW-3207E (fluorescent pink water dispersion element manufactured by Nihon Keikoh Kagaku kabushiki Kaisha) or NKW-3205E (fluorescent yellow water dispersion element manufactured by Nihon Keikoh Kagaku kabushiki Kaisha), but only needs to be a dispersion element having fluorescent property.

The above-mentioned fluorescent dispersion element is combined with a known solvent and a known activator and is then dispersed to be made into ink. The dispersion method for the fluorescent dispersion element is not particularly limited. For example, a fluorescent dispersion element dispersed by surfactant or a resin dispersed fluorescent dispersion element dispersed by dispersed resin can be used. Naturally, a combination of fluorescent dispersion elements different in dispersion method can also be used. Surfactant to be usable includes anionic, non-ionic, cationic, and zwitterionic activators. While dispersed resin to be suable can be any type of resin as long as it is resin having water solubility or water dispersibility, from among those, particularly, dispersed resin the weight-average molecular weight of which is 1,000 or more and 100,000 or less or the weight-average molecular weight of which is 3,000 or more and 50,000 or less is favorable. With regard to the solvent, it is favorable to use, for example, an aqueous medium containing water and a water-soluble organic solvent.

Fluorescent color material is a color material which is producing color by absorbing light of excitation wavelength to enter from the ground state into the excited state and emitting light of luminescence wavelength to return to the ground state.

Figure 10:
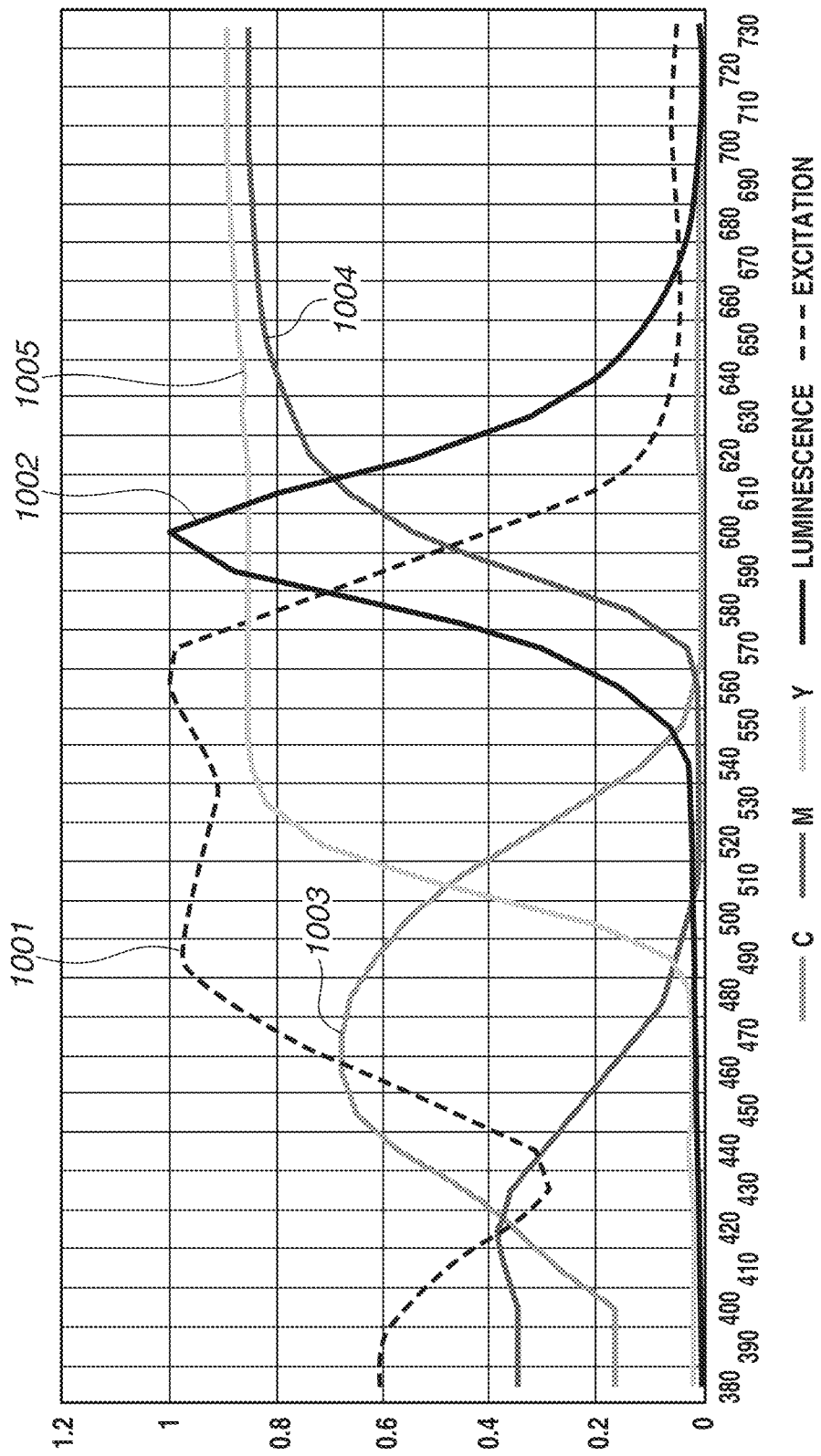
FIG. 10 is an intensity graph relative to wavelengths used when recording is performed on a recording medium.

FIG. 10 is a graph illustrating the intensity of excitation 1001 and the intensity of luminescence 1002 in an image recorded with fluorescent pink ink on a recording medium. In the graph of FIG. 10, the horizontal axis indicates wavelength of light, and the vertical axis indicates intensity. This graph represents the intensity of light detected while the wavelength of light to be applied to a recording sample and the wavelength of light to be received from the recording sample are being varied. FIG. 10 illustrates the intensity of light received from the recording sample when light of wavelength being excited is radiated onto the recording sample.

The luminescence 1002 constitutes a graph obtained when light of wavelength 480 nanometers (nm) is radiated onto a recording sample for fluorescent pink in the first exemplary embodiment. The excitation 1001 represents the intensity of light received when the wavelength of light to be received is fixed and the wavelength of light to be radiated onto the recording sample is varied. FIG. 10 is a graph obtained when the wavelength of light to be received is fixed to 600 nm in fluorescent pink in the first exemplary embodiment. As also understandable from FIG. 10, the excited wavelength region of fluorescent ink recorded on a recording medium becomes a short wavelength side while overlapping a luminous wavelength region. Moreover, the excitation 1001 has strengths and weaknesses for respective wavelengths and has wavelengths for efficiently becoming luminous and wavelengths for not so. Moreover, since a fluorescent color material is luminous, in many cases, the reflectance in luminescence wavelengths exceeds "1". In the first exemplary embodiment, a color material having the above-mentioned property is defined as a fluorescent color material.

While, in the above description, excitation and luminescence of fluorescent pink have been described, fluorescent ink emitting light having other wavelengths can be employed in the first exemplary embodiment. For example, fluorescent blue emitting light with a blue region (450 nm to 500 nm) or fluorescent green emitting light with a green region (500 nm to 565 nm) can also be employed. Fluorescent yellow emitting light with a yellow region (565 nm to 590 nm) can also be employed. For example, fluorescent orange or fluorescent red emitting light with a red region (590 nm to 780 nm) can also be employed. Additionally, a combination of some of the above-mentioned fluorescent inks can also be employed. For example, fluorescent yellow having a combination of luminescence of light with a yellow region and luminescence of light with a red region can be employed. Additionally, a combination of fluorescent inks different in the intensity of excited wavelengths the color tone of which has been adjusted can also be employed. For example, fluorescent pink which is weak in the excitation of a blue region and strong in the excitation of a green region and emits light with an orange region can be employed.

In the first exemplary embodiment, subtractive color mixture ink is defined as ink which absorbs light of predetermined specific wavelengths out of the radiated light and contains a color material not becoming luminous. The subtractive color mixture ink in the first exemplary embodiment includes inks for four colors, i.e., cyan, magenta, yellow, and black. In the case of using the above-mentioned light cyan ink, light magenta ink, gray ink, and light gray ink, these inks are also treated as subtractive color mixture ink. In FIG. 10, the line 1003 indicates the spectral reflectance of cyan (C) ink, the line 1004 indicates the spectral reflectance of magenta (M) ink, and the line 1005 indicates the spectral reflectance of yellow (Y) ink. The graph of FIG. 10 illustrates measurements result obtained by using a known measuring method for spectral reflectance. Unlike fluorescent ink, subtractive color mixture ink only absorbs light, so that the reflectance of subtractive color mixture ink never exceeds "1".

Next, the case of mixing fluorescent ink and subtractive color mixture ink on a recording medium is described.

In a case where fluorescent pink and yellow have been mixed, yellow absorbs light with a wavelength region of the excitation 1001 of fluorescent pink. Therefore, due to light to be excited being absorbed by yellow, fluorescent pink is not able to be sufficiently excited, so that luminescence may be prevented or reduced. In a case where fluorescent pink and cyan 1003 have been mixed, cyan absorbs light with a wavelength region of the luminescence 1002 of fluorescent pink. Therefore, light emitted by fluorescent pink is absorbed by cyan ink, so that luminescence may be prevented or reduced. In a case where fluorescent pink and magenta 1004 have been mixed, magenta absorbs light with a wavelength region high in excitation sensitivity of fluorescent pink, and also absorbs luminescence. Thus, in a case where fluorescent pink and subtractive color mixture ink have been mixed on a recording medium, the contribution rate of fluorescent pink to luminescence may remarkably decrease. Similarly, examples of ink which absorbs light with a wavelength region high in excitation sensitivity of fluorescent pink include black ink and green ink. As is well known, black ink absorbs wavelengths of all of the visible regions and, therefore, has the largest influence.

Figure 11:
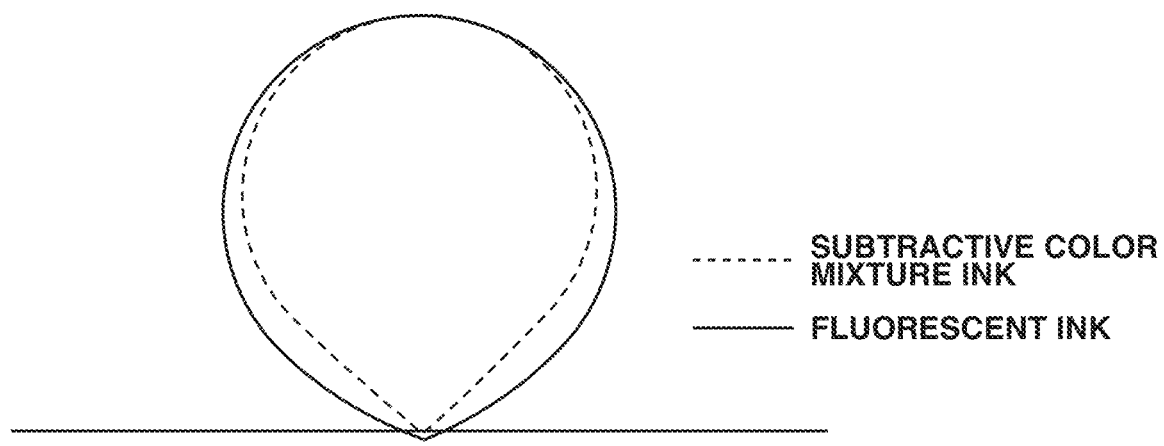
FIG. 11 is a graph illustrating deflection angle reflection characteristics of subtractive color mixture ink and fluorescent ink.

FIG. 11 is a graph illustrating deflection angle reflection characteristics of fluorescent ink and subtractive color mixture ink. The solid line, which indicates the deflection angle reflection characteristics of fluorescent ink, and the dashed line, which indicates the deflection angle reflection characteristics of subtractive color mixture ink, schematically represent bidirectional reflectance distribution functions. The measuring method for deflection angle reflection characteristics can be a known method. For example, there is known a method of radiating vertical light to a sample recorded on a recording medium and detecting the received reflected light from varying angles. As understandable from FIG. 11, the deflection angle reflection characteristics of fluorescent ink show that light scatters in an isotropic manner as compared with the deflection angle reflection characteristics of subtractive color mixture ink. This is because, since fluorescent ink absorbs light, is excited, and becomes luminous, the directionality of entering light disappears, so that the deflection angle reflection characteristics of fluorescent ink depend strongly on the directionality of light of luminescence of fluorescent ink. Therefore, through this experiment, it is understandable that fluorescent ink is stronger in scattering of light than subtractive color mixture ink.

Moreover, according to these results, fluorescent ink is small in a change of reflection intensity caused by the angle of receiving light and subtractive color mixture ink is large in a change of reflection intensity caused by the angle of receiving light. This shows that, with regard to fluorescent ink, even if the angle of receiving light changes, color change is unlikely to be sensed by human eyes. On the other hand, this shows that, with regard to subtractive color mixture ink, when the angle of receiving light changes, color change is sensed by human eyes. For example, with respect to a color which has been viewable at the specular reflection side, the reflection intensity becoming weaker as the angle difference becomes larger causes a color which is viewable to become gradually pale. This difference in reflection characteristic caused by deflection angles is referred to as "angle dependence".

Figure 12A:
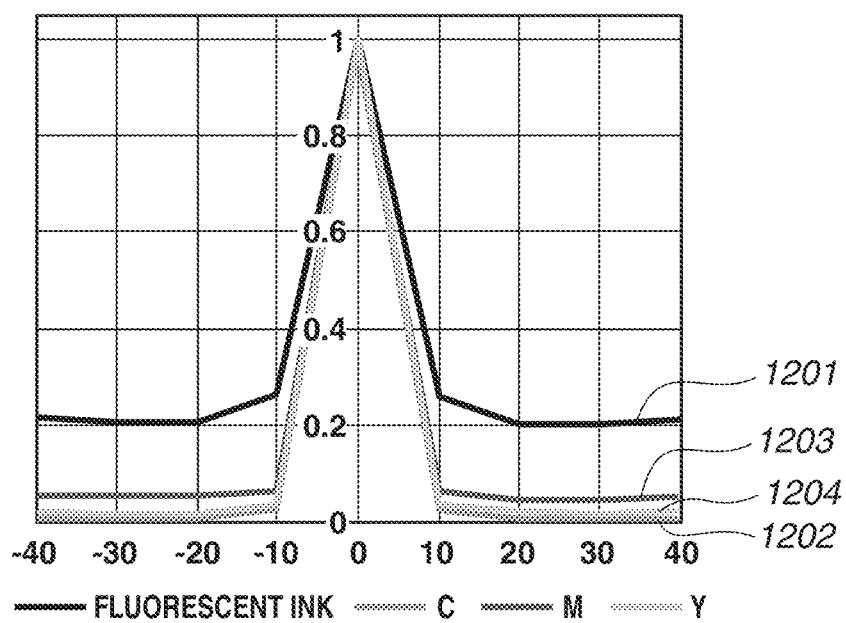
FIGS. 12A and 12B are graphs concerning deflection angle reflection characteristics of subtractive color mixture ink and fluorescent ink.
Figure 12B:
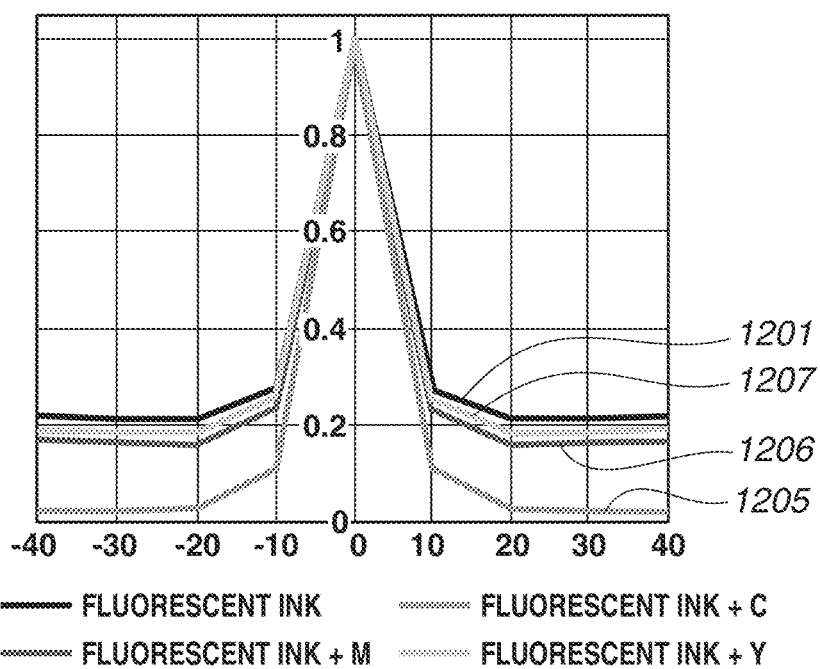

FIGS. 12A and 12B are graphs illustrating deflection angle reflection characteristics of fluorescent pink ink and subtractive color mixture ink.

These graphs are obtained by using a pattern to which fluorescent pink ink and subtractive color mixture ink have been applied on a recording medium, setting the received light wavelength to 600 nm, setting the specular reflection intensity to "1", and measuring the reflection intensity (spectral reflectance) with the light receiving angle being varied by a known measuring method. The horizontal axis indicates a deflection angle with the specular reflection set to 0°, and the vertical axis indicates intensity.

FIG. 12A illustrates deflection angle reflection characteristics with respect to a pattern of ink single color in the received light wavelength of 600 nm. The line 1201 indicates the deflection angle reflectance of a fluorescent pink ink single color pattern, the line 1202 indicates the deflection angle reflectance of a cyan (C) ink single color pattern, the line 1203 indicates the deflection angle reflectance of a magenta (M) ink single color pattern, and the line 1204 indicates the deflection angle reflectance of a yellow (Y) ink single color pattern. Subtractive color mixture ink does not become luminous and is, therefore, high in the reflection intensity at an angle of 0° being specular reflection and low in the reflection intensity at the other angles. Thus, it can be said that subtractive color mixture ink is high in angle dependence. On the other hand, it can be said that fluorescent pink ink is small in a difference in the reflection intensity caused by angles, is low in angle dependence, and is excellent in noticeability.

FIG. 12B illustrates deflection angle reflection characteristics of fluorescent pink ink single color in the received light wavelength of 600 nm and deflection angle reflection characteristics of a color obtained by mixing fluorescent pink ink with subtractive color mixture ink at a ratio of 3:1. The line 1201 indicates the deflection angle reflectance of a fluorescent pink ink single color pattern, and the line 1205 indicates the deflection angle reflectance of a pattern obtained by mixing fluorescent pink ink with cyan (C) ink. Similarly, the line 1206 indicates the deflection angle reflectance of a pattern obtained by mixing fluorescent pink ink with magenta (M) ink, and the line 1207 indicates the deflection angle reflectance of a pattern obtained by mixing fluorescent pink ink with yellow (Y) ink. In the pattern obtained by mixing fluorescent pink ink with cyan ink, light emitted from a color material of fluorescent pink ink is absorbed by a color material of cyan ink, so that luminescence is prevented or reduced. Additionally, isotropic scattering of light is prevented or reduced, so that the reflection intensity stops showing an isotropic tendency. As a result, compared with the reflection intensity of specular reflection, the reflection intensity at the other angles becomes weak, so that the angle dependence becomes high and the noticeability decreases. On the other hand, since magenta ink or yellow ink, which less absorbs light emitted from fluorescent pink ink than cyan ink, is reduced in angle dependence, so that a decrease in noticeability can be prevented or reduced.

FIGS. 6A, 6B, 6C, and 6D are block diagrams illustrating respective processing operations which are performed by the design software 102, the RIP software 103, and the inkjet recording apparatus 104. FIGS. 6A to 6D illustrate examples which differ in processing blocks.

First, the processing operations illustrated in FIG. 6A are described. The design software 102 creates RGB data 601 and fluorescent pink data 602 as image data, and inputs the RGB data 601 and fluorescent pink data 602 to the RIP software 103.

A user who performs editing with the design software 102 designates a density, on a recording medium, of fluorescent pink ink, and inputs the designated density. The method for designation can be making a selection from a swatch as mentioned with reference to FIG. 2 or setting a desired pixel value.

Plate making 603 included in the RIP software 103 performs the plate making processing described above with reference to FIG. 3 on the RGB data 601 and the fluorescent pink data 602.

Color management system (CMS) 604 included in the RIP software 103 performs color management on the RGB data 601. Here, the CMS 604 converts standard RGB data created by the design software 102 into device RGB data conforming to a recording apparatus and a recording medium type on which to record an image. This reduces any deviation between a visual appearance on the display of the PC 101 and a visual appearance of a recorded product. Since the size of a color gamut which is expressible by the display is large relative to the printed product, various mapping methods are conceivable for color management. For example, there are a method of pasting a range exceeding an expression gamut of the printed product on a gamut limit of the printed product and a method of performing plotting in such a way as to wholly push a range exceeding an expression gamut of the printed product into the gamut center. In the first exemplary embodiment, as an input to the CMS 604, the RGB data 601 is assumed.

Data to be transferred to the inkjet recording apparatus 104 is image data obtained by superimposing channels for respective RGB colors separated into halftone dot data. In the first exemplary embodiment, pieces of data corresponding to respective colors in image data composed of a plurality of colors are referred to as "channels". Since fluorescent pink ink is special color ink, in the first exemplary embodiment, the fluorescent pink data 602 is transferred to the inkjet recording apparatus 104 without passing through the CMS 604 as a channel for fluorescent ink. However, whether to input the fluorescent pink data 602 to the CMS 604 is not limited.

Furthermore, data separated into a plurality of channels is not limited to RGB data, and, while three colors of RGB are mentioned, the number of channels can be the number of channels for subtractive color mixture of N colors (N being an integer greater than or equal to "0") corresponding to the number of colors of subtractive color mixture inks, such as CMYK. Moreover, while, in the first exemplary embodiment, to the inkjet recording apparatus 104, one piece of image data obtained by superimposing a plurality of channels is transferred, image data can be transferred on a channel-by-channel basis.

Each processing operation in the inkjet recording apparatus 104 is performed by the image processing unit main control unit 411 illustrated in FIG. 4.

Ink separation 605 performs ink separation processing on the RGB data 601 subjected to color management. In the ink separation processing, image data is color-separated into ink signal values including elements respectively corresponding to respective ink colors included in the recording head 405 based on color distributions of RGB. In the first exemplary embodiment, ink signal values of 256 gradations corresponding to subtractive color mixture inks for four colors, i.e., cyan, magenta, yellow, and black, other than fluorescent pink out of inks for five colors included in the recording head 405 are generated. Here, parameters for the ink separation processing are designed in such a way as to become less than or equal to an application amount upper limit per unit area of a recording medium for recording an image. Thus, before the ink separation processing is performed, type information indicating the type of a recording medium and information concerning quality or mode in the recording unit 401 are acquired, and parameters for the ink separation processing are selected based on such pieces of information. Furthermore, the application amount upper limit in the ink separation processing is determined based on some design guides. For example, the parameters are determined in such a way as to prevent such a situation that, if ink is applied any further, unevenness occurs on a recording medium. In addition, there are, for example, design guides taking into account that, during continuous recording, ink ejected to a recording result be prevented from adhering to a recording medium for a next recording result and that ink on a recording medium be prevented from overflowing and adhering to the surface of the recording head 405. Referring to FIG. 6A, the fluorescent pink data 602, which has been input from the design software 102 to the RIP software 103, is density data indicating ink density of 256 gradations and is, therefore, not a processing target for the ink separation 605. Furthermore, the number of gradations is not limited to "256".

Gamma conversion 606 performs gradation conversion using gamma curves on ink signal values respectively corresponding to a plurality of color inks for use in the printer (inkjet recording apparatus) 104. This is directed to linearly associating changes of signal values output from the ink separation 605 with densities on a recording medium. If one droplet of ink is ejected to a white background of the recording medium, the color rapidly changes relative to white. On the other hand, even if one droplet of ink is further added to a state in which several droplets of ink have already been ejected, changes in color are dull. The gamma conversion 606 applies gamma curves to ink signal values in such a manner that apparent colors change in a linear fashion. In the first exemplary embodiment, the fluorescent pink data 602, which has been input from the design software 102 to the RIP software 103, is also targeted for the gamma conversion 606.

Furthermore, while the ink separation 605 or the gamma conversion 606 are generally implemented by performing conversion using a look-up table, the first exemplary embodiment is not limited to this. For example, a method of performing conversion using a calculating formula can be employed.

Application amount limitation 607 performs correction of an application amount with respect to ink signal values for all of the ink colors including fluorescent pink data. This is directed to performing limitation in such a manner that the total of ink amounts applied per unit area does not exceed an acceptable upper limit amount for a recording medium. Hereinafter, the upper limit value of an ink amount to be applied per unit area is also referred to as an "ejection amount limit value". In the first exemplary embodiment, the application amount limitation 607 performs processing for determining whether, with respect to one pixel of image data for each ink color generated by the ink separation 605, a total value of application amounts exceeds an upper limit value being a threshold value and, if the total value exceeds the upper limit value, reducing an ink application amount in such a way as to prevent the total value from exceeding the upper limit value.

Furthermore, the acceptable upper limit amount for a recording medium, which is used for determination by the application amount limitation 607, can be the same as or can be different from the "application amount upper limit" mentioned with regard to the ink separation 605. In the first exemplary embodiment, the acceptable upper limit amount is assumed to be the same value as the application amount upper limit value set in the parameters for use in the ink separation 605. Furthermore, in the ink separation 605, a boundary value which is used to determine whether, if ink is applied beyond the boundary value, unevenness occurs in an image can be set as an upper limit. On the other hand, in the application amount limitation 607, a boundary value which is used to determine whether, during continuous recording, ink ejected to a recording result also disadvantageously adheres to a recording medium for a next recording result can be set as an upper limit. The details of the application amount limitation 607 are described separately below.

Quantization 608 converts each piece of ink data subjected to gamma conversion into dot data. The printer (inkjet recording apparatus) 104 ejects ink to express densities on a recording medium. However, the number of dots which are able to be ejected to a square area of 600 dots per inch (dpi) is restricted due to various factors such as the nozzle arrangement density of a print head, specification electric power, ink supplementation, and the recording productivity desired by the user. To express a density which has been expressed by ink data on a recording medium, the quantization 608 dispersedly locates dots with each square of 600 dpi. The quantization 608 performs dark-color and light-color expression with respect to each square of 1200 dpi, 2400 dpi, or broader area size to implement area gradation. The dot resolution stated herein is merely an example, and the first exemplary embodiment is not limited to this.

FIG. 6B illustrates processing blocks different from those illustrated in FIG. 6A. Here, differences from those illustrated in FIG. 6A are described. Ink separation 605 illustrated in FIG. 6B is assumed to receive RGB data 601 to convert the RGB data 601 into fluorescent pink data.

Data composition 609 combines fluorescent pink data obtained by conversion performed by the ink separation 605 and fluorescent pink data 602 received from the RIP software 103, which are pieces of data of the same color, to output a composition result. The data composition 609 can be performed before the gamma conversion 606. Alternatively, the data composition 609 can be performed after the application amount limitation 607 or the quantization 608. This block combines two pieces of fluorescent pink ink data into one piece of data corresponding to the print head of the printer (inkjet recording apparatus) 104. The composition method can be performed with use of knockout, overprint, or multiplication described above with reference to FIG. 3, or can be performed with another method.

FIG. 6C illustrates processing blocks different from those illustrated in FIGS. 6A and 6B. Here, differences from those illustrated in FIGS. 6A and 6B are described. In FIG. 6C, CMYK data 610 is received from the design software 102. RGB conversion 611 converts the received CMYK data 610 into RGB data. The RGB conversion 611 can be configured to be integral with the CMS 604. Furthermore, while, in FIG. 6C, data composition 609 is performed, a configuration in which, as illustrated in FIG. 6A, fluorescent pink data is not generated by the ink separation 605 and data composition 609 is not performed can be employed.

FIG. 6D illustrates processing blocks different from those illustrated in FIGS. 6A, 6B, and 6C.

Here, differences from those illustrated in FIGS. 6A, 6B, and 6C are described. In FIG. 6D, respective pieces of ink data 612 generated by the design software 102 are input as channels for respective colors to the inkjet recording apparatus 104. The respective pieces of ink data 612 are, for example, pieces of data corresponding to cyan, magenta, yellow, and black inks. The user designates and inputs densities even for the other color inks as with fluorescent pink data 602.

Dark-color and light-color separation 613 separates respective pieces of ink data 612 excluding fluorescent pink data into a plurality of pieces of ink data. For example, the dark-color and light-color separation 613 separates cyan data into cyan data and light cyan data and separates magenta data into magenta data and light magenta data. Since light ink such as light cyan ink or light magenta ink is used in such a manner that granularity is not visible in a recording product, ink data for light ink is generated not by the user but by the printer side. The dark-color and light-color separation 613 is effective in a case where light ink is included in the inks mounted in the recording head 405. In a case where light ink is not used or ink data concerning light ink is also created by the user with the design software 102, the dark-color and light-color separation 613 does not need to be performed.

Application amount limitation 607 is performed in each of the use cases illustrated in FIGS. 6A to 6D. In the use cases illustrated in FIGS. 6A to 6C, only fluorescent pink data does not pass through the ink separation 605. Therefore, if fluorescent pink data is put in an output result of the ink separation 605, a total value of ink application amounts is assumed to increase. In a case where the total value of ink application amounts per unit area is larger than a threshold value, ink overflow may occur in a recording product, thus causing a decrease in image quality. In the use case illustrated in FIG. 6D, since the user is able to freely perform density setting on all of the pieces of ink data, it can be said that the possibility of ink overflow occurring is larger. The application amount limitation 607, which is a characteristic configuration in the present exemplary embodiment, is a processing operation for preventing or reducing such issues.

FIG. 7 is a flowchart used to explain a program for application amount excess determination processing, which is performed by the application amount limitation 607. A series of processing operations illustrated in FIG. 7 is performed by a CPU included in the image processing unit main control unit 411.

In step S701, the CPU initializes a variable SUM, a variable SUMsub, and a variable i with "0". The variable SUM, the variable SUMsub, and the variable i are used at a later point in the flowchart.

In step S702, the CPU performs loop processing. The variable i, which functions as a loop counter, is already initialized with "0" in step S701. A constant COL_NUM is associated with the number of ink colors included in the recording head 405. For example, in a case where inks which are ejected from the recording head 405 are five color inks for cyan, magenta, yellow, black, and fluorescent pink, the constant COL_NUM is "5". The loop counter i is used to perform loop processing for a number of times (COL_NUM−1). If the loop counter i is less than the constant COL_NUM (YES in step S702), the CPU advances the processing to step S703. If the loop counter i is greater than or equal to the constant COL_NUM (NO in step S702), the CPU advances the processing to step S707.

In step S703, the CPU adds the application amount of an ink color which is an ink identification (ID) corresponding to the loop counter i to the variable SUM.

In step S704, the CPU determines whether the ink ID corresponding to the loop counter i is fluorescent color. In the first exemplary embodiment, the ink ID of fluorescent color is "4" as illustrated in FIG. 8 described below. If the ink ID corresponding to the loop counter i indicates ink of fluorescent color (YES in step S704), the CPU advances the processing to step S706, and, if the ink ID corresponding to the loop counter i indicates ink of other than fluorescent color (NO in step S704), the CPU advances the processing to step S705.

In step S705, the CPU adds the application amount of an ink color which is an ink identification (ID) corresponding to the loop counter i to the variable SUMsub.

In step S706, the CPU increments the loop counter i. Thus, the CPU performs loop processing of step S703 to S706 a number of times (COL_NUM-1).

In step S707, the CPU performs determination processing using the variable SUM and an application amount excess determining threshold value TH. The application amount excess determining threshold value TH is associated with an upper limit acceptable by a recording medium. For example, if, in a case where the ink application amount exceeds "1000" in a glossy recording medium, ink may overflow from the recording medium, thus causing a failure of the apparatus, the application amount excess determining threshold value TH is set to "1000". The application amount excess determining threshold value TH can be set to various different values depending on recording medium types. Moreover, the number of times of scanning of the recording head 405 on a designated region of a recording medium varies depending on recording qualities which are selectable by the user. Since the upper limit acceptable by a recording medium varies even by the landing timing varying due to a difference in the number of times of scanning, the application amount excess determining threshold value TH can be set to respective different values depending on not only recording medium types but also recording qualities. The application amount excess determining threshold value TH is stored in a ROM or RAM included in the image processing unit main control unit 411 and is acquired based on at least one of type information indicating the type of a recording medium and quality information indicating a recording quality. Furthermore, when the flow illustrated in FIG. 7 is performed, the application amount excess determining threshold value TH can be externally set via the operation unit 414, or a configuration in which the application amount excess determining threshold value TH is acquired from the RIP software 103 or an external HDD via the external connection OF 416 can be employed. If the result of the determination processing in step S707 is YES (SUM≥TH), the CPU advances the processing to step S708, and, if the result of the determination processing in step S707 is NO (SUM<TH), the CPU advances the processing to step S709.

In step S708, since the processing being advanced to this step means that the total value of ink application amounts exceeds the upper limit acceptable by a recording medium, the CPU advances the processing to an application amount limitation processing flowchart.

In step S709, since the processing being advanced to this step means that the total value of ink application amounts is within the upper limit acceptable per one pixel by the recording medium, the CPU ends the application amount limitation 607 without advancing the processing to the application amount limitation processing flowchart.

Furthermore, a series of processing operations in the flow illustrated in FIG. 7 is performed on all of the pixels on a pixel-by-pixel basis. Thus, in the first exemplary embodiment, the CPU compares the total value of ink application amounts per one pixel with the application amount excess determining threshold value TH based on the CMYK values and P value of each pixel.

FIG. 8 shows an ink ID, an ink name, an application amount to a given pixel value, and a priority order for ink application amount reduction. In the example illustrated in FIG. 8, the ink ID is set to "0" to "4", cyan ink is associated with ink ID=0, and the application amount of cyan ink to a given pixel is set to "250". The ink ID in step S703 illustrated in FIG. 7 corresponds to one of ink IDs=0 to 4 illustrated in FIG. 8. The application amount is assumed to vary depending on pixels. In the example illustrated in FIG. 8, the total value SUM of application amounts is "1015". In the case of TH=1000, since SUM≥TH holds, the processing is advanced to the application amount limitation processing. The priority order for ink application amount reduction is set starting with "0" in the order from ink which absorbs luminescence of fluorescent ink, and fluorescent ink is set as the last in the priority order. In the present example, since black ink is mounted, the priority order of black ink is high and is thus set to "0". Then, the priority order is next set in the order of cyan ink, magenta ink, and yellow ink, as illustrated in FIG. 8.

Figure 9:
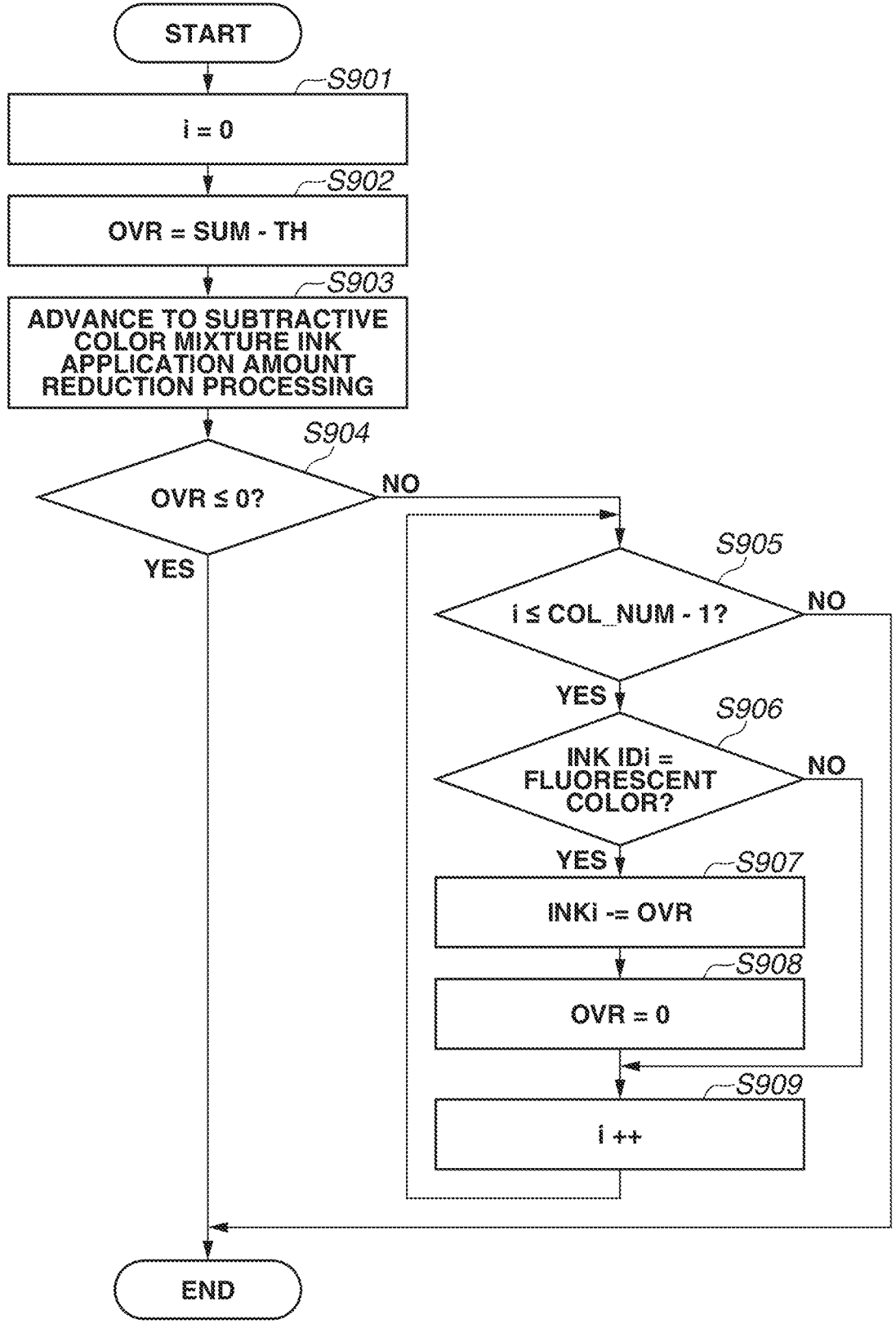
FIG. 9 is a flowchart of application amount limitation processing in the first exemplary embodiment.

FIG. 9 is a flowchart used to explain a program for application amount limitation processing which is performed by the application amount limitation 607. A series of processing operations illustrated in FIG. 9 is performed by a CPU included in the image processing unit main control unit 411.

In step S901, the CPU initializes a variable i with "0". The variable i is used at a later point in the flowchart. In step S902, the CPU defines a variable OVR. The variable OVR is a value calculated with use of the variable SUM and the application amount excess determining threshold value TH, which are used in the flowchart of FIG. 7. Here, the value of the variable SUM reflects a result obtained by serial addition performed in step S703 in the flowchart of FIG. 7. The variable OVR represents an amount by which the total value of ink application amounts for a pixel of interest has exceeded the upper limit acceptable by a recording medium. In step S903, the CPU performs application amount reduction processing for subtractive color mixture ink. The details of the application amount reduction processing are described below.

In step S904, the CPU determines whether the variable OVR is less than or equal to "0". The value of the variable OVR at this timing is a value obtained by reducing the application amount of subtractive color mixture ink in the processing for reducing the application amount of subtractive color mixture ink in step S903. Accordingly, a case where the variable OVR is less than or equal to "0" in step S904 (YES in step S904) means that, due to the application amount of subtractive color mixture ink being reduced, the total value of application amounts of all of the inks has become less than or equal to the threshold value. Therefore, the CPU ends the processing. On the other hand, a case where the variable OVR is greater than "0" (NO in step S904) indicates that, even if the processing for reducing the application amount of subtractive color mixture ink is performed, the total value of ink application amounts for a pixel of interest has not become less than or equal to the threshold value. In this case, since further reduction processing is required, the CPU advances the processing to step S905.

In step S905, the CPU performs loop processing. The variable i, which functions as a loop counter, is already initialized with "0" in step S901. A constant COL_NUM is associated with the number of ink colors included in the recording head 405. For example, in a case where the recording head 405 is compatible with cyan, magenta, yellow, black, and fluorescent pink inks, the constant COL_NUM is "5". The loop counter i is used to perform loop processing for a number of times (COL_NUM−1). If the loop counter i is less than the constant COL_NUM (YES in step S905), the CPU advances the processing to step S906. If the loop counter i is greater than or equal to the constant COL_NUM (NO in step S905), the CPU ends the processing.

In step S906, the CPU determines whether the ink ID corresponding to the loop counter i is fluorescent color. In the first exemplary embodiment, the ink ID of fluorescent color is "4" as illustrated in FIG. 8. If the ink ID corresponding to the loop counter i indicates ink of fluorescent color (YES in step S906), the CPU advances the processing to step S907, and, if the ink ID corresponding to the loop counter i indicates ink of other than fluorescent color (NO in step S906), the CPU advances the processing to step S909.

In step S907, the CPU subtracts the variable OVR from the application amount of fluorescent ink. The value of the variable OVR in step S907 is a value obtained by subtracting the application amount of subtractive color mixture ink from an amount by which the total value of ink application amounts for a pixel of interest has exceeded the upper limit. The variable OVR being greater than or equal to "0" at this timing means that it is not possible to decrease the total value of ink application amounts to less than or equal to the threshold value only by reducing subtractive color mixture ink. Accordingly, it is necessary to decrease not only the application amount of subtractive color mixture ink but also the application amount of fluorescent ink. Here, subtracting the variable OVR from the application amount of fluorescent ink enables decreasing the total value of ink application amounts for a pixel of interest to less than or equal to the threshold value. In step S908, the CPU updates the value of the variable OVR with "0".

In step S909, the CPU increments the loop counter i, and then advances the processing to step S905, thus repeating processing in step S905 and step S906 up to the number of times (COL_NUM−1).

Figure 13:
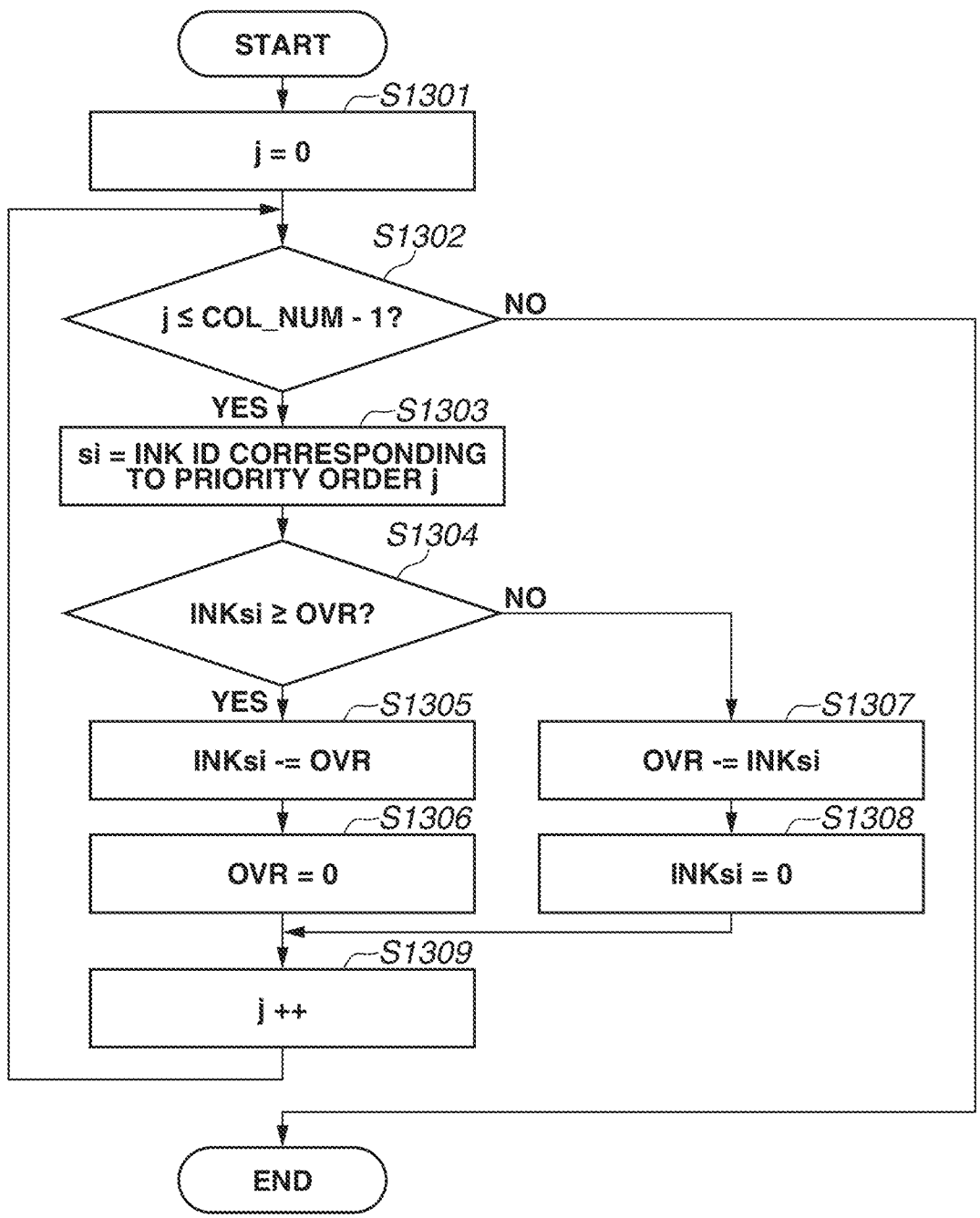
FIG. 13 is a flowchart of a first example of processing in a program for subtractive color mixture ink application amount reduction processing.

FIG. 13 is a flowchart used to explain a first example of processing for reducing the application amount of subtractive color mixture ink in step S903 in the first exemplary embodiment. In step S1301, the CPU initializes a variable j with "0".

In step S1302, the CPU performs loop processing. The variable j functions as a loop counter. A constant COL_NUM is associated with the number of ink colors included in the recording head 405. For example, in a case where the recording head 405 is compatible with cyan, magenta, yellow, black, and fluorescent pink inks, the constant COL_NUM is "5". The loop counter j is used to perform loop processing for a number of times (COL_NUM−1). If the loop counter j is less than the constant COL_NUM (YES in step S1302), the CPU advances the processing to step S1303. If the loop counter j is greater than or equal to the constant COL_NUM (NO in step S1302), the CPU ends the processing.

In step S1303, the CPU acquires an ink ID corresponding to a priority order corresponding to the loop counter j, and stores the acquired ink ID in a variable si. In step S1304, the CPU performs determination processing using an ink application amount INKsi, which corresponds to the priority order Si, and a variable OVR, which indicates an ink excess amount. If it is determined that the ink application amount INKsi, which corresponds to the priority order Si, is greater than or equal to the variable OVR (YES in step S1304), the CPU advances the processing to step S1305, and, if it is determined that the ink application amount INKsi is less than the variable OVR (NO in step S1304), the CPU advances the processing to step S1307.

In step S1305, the CPU subtracts the variable OVR from the ink application amount INKsi corresponding to the priority order j, thus correcting the ink application amount. In step S1306, the CPU updates the value of the variable OVR with "0". In step S1307, the CPU subtracts ink application amount INKsi corresponding to the priority order j from the variable OVR. In step S1308, the CPU updates the value of the ink application amount INKsi corresponding to the priority order j with "0". In step S1309, the CPU increments the loop counter j, and then advances the processing to step S1302.

Figure 14:
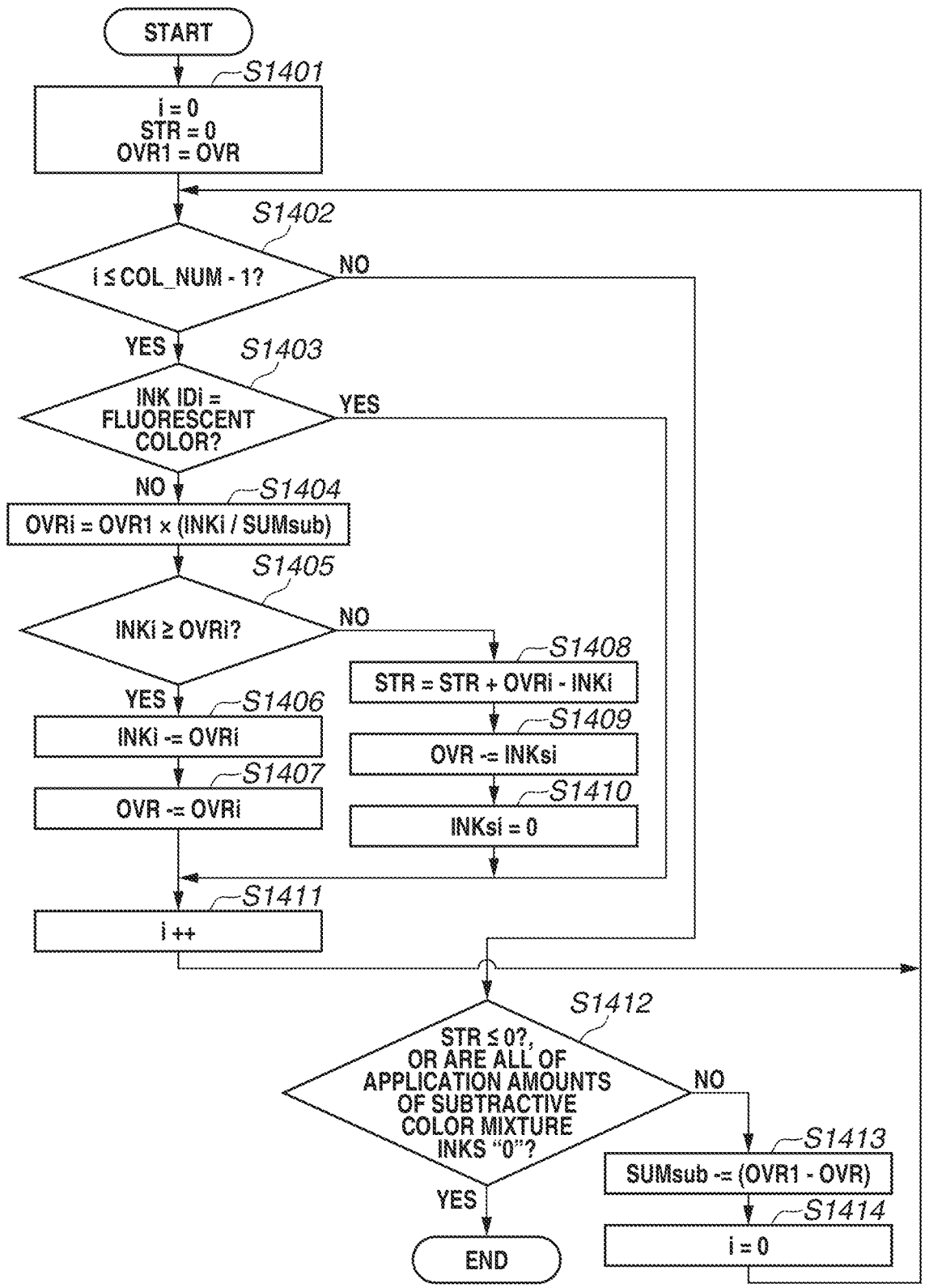
FIG. 14 is a flowchart of a second example of processing in a program for subtractive color mixture ink application amount reduction processing.

FIG. 14 is a flowchart used to explain a second example of processing for reducing the application amount of subtractive color mixture ink in step S903 in the first exemplary embodiment. In step S1401, the CPU initializes a variable i and a variable STR with "0". Additionally, the CPU sets the value of the variable OVR to a variable OVR1. The variable i, the variable STR, and the variable OVR1 are used at a later point in the flowchart.

In step S1402, the CPU performs loop processing. The variable i functions as a loop counter. A constant COL_NUM is associated with the number of ink colors included in the recording head 405. For example, in a case where the recording head 405 is compatible with cyan, magenta, yellow, black, and fluorescent pink inks, the constant COL_NUM is "5". The loop counter i is used to perform loop processing for a number of times (COL_NUM−1). If the loop counter i is less than the constant COL_NUM (YES in step S1402), the CPU advances the processing to step S1403. If the loop counter i is greater than or equal to the constant COL_NUM (NO in step S1402), the CPU advances the processing to step S1412.

In step S1403, the CPU determines whether an ink ID corresponding to the loop counter i is fluorescent color. In the first exemplary embodiment, as illustrated in FIG. 8, the ink ID of fluorescent color is "4". If the ink ID corresponding to the loop counter i is not an ink of fluorescent color (NO in step S1403), the CPU advances the processing to step S1404, and, if the ink ID is ink of fluorescent color (YES in step S1403), the CPU advances the processing to step S1411.

In step S1404, the CPU calculates a variable OVRi indicating an application amount by which a reduction is desired with respect to an ink application amount INKi of the ink ID corresponding to the loop counter i. The value of the variable OVRi corresponding to the ink application amount INKi is calculated by multiplying the variable OVR1 indicating an excess amount for a pixel of interest calculated in the flow illustrated in FIG. 9 by a result obtained by dividing the application amount INKi of each subtractive color mixture ink by the variable SUMsub indicating the total values of application amounts of subtractive color mixture inks. As a result, weighting becomes larger with respect to an ink color the initial application amount of which is larger out of subtractive color mixture inks, so that it is possible to reduce the application amount of each ink while maintaining color balance of subtractive color mixture inks.

In step S1405, the CPU compares the application amount INKi corresponding to the ink ID corresponding to the loop counter i with the variable OVRi indicating an application amount by which a reduction is desired, calculated in step S1404.

If the application amount INKi is greater than or equal to the variable OVRi (YES in step S1405), the CPU advances the processing to step S1406, and, if the application amount INKi is less than the variable OVRi (NO in step S1405), the CPU advances the processing to step S1408.

In step S1406, the CPU subtracts the variable OVRi calculated in step S1404 from the application amount INKi corresponding to the ink ID. In step S1407, the CPU also subtracts the variable OVRi from the variable OVR.

In step S1408, the CPU calculates an application amount which has not been able to be subtracted with the application amount INKi corresponding to the ink ID with respect to the variable OVRi calculated in step S1404, and adds the calculated application amount to the variable STR. The variable STR is already initialized in step S1401. The variable STR represents a total value of amounts obtained by subtracting the application amount of subtractive color mixture ink from the excess amount.

In step S1409, the CPU subtracts the ink application amount INKsi, which is an application amount which has been able to be subtracted, from the variable OVR, which represents an amount by which the total value of ink application amounts for a pixel of interest has exceeded the upper limit. In step S1410, the CPU updates the value of the ink application amount INKsi with "0". In step S1411, the CPU increments the loop counter i, and then advances the processing to step S1402.

In step S1412, the CPU determines whether the variable STR, which represents a total value of application amounts which have not been able to be subtracted from the application amount of given subtractive color mixture ink, is less than or equal to "0" or whether all of the ink application amounts of subtractive color mixture inks are currently "0". If the variable STR is less than or equal to "0" or all of the ink application amounts of subtractive color mixture inks are currently "0" (YES in step S1412), the CPU ends the processing. If the variable STR is greater than "0" and at least one of application amounts of subtractive color mixture inks is greater than "0" (NO in step S1412), the CPU advances the processing to step S1413 to reduce the ink application amount in such a way as to become less than or equal to the threshold value with respect to ink the application amount of which is not yet "0" out of subtractive color mixture inks.

In step S1413, the CPU subtracts an application amount (OVR1-OVR) of subtractive color mixture ink which has been able to be reduced to decrease the application amount up to the threshold value from the total value SUMsub of application amounts of subtractive color mixture inks. In step S1414, the CPU updates the loop counter i with "0", and advances the processing to step S1402.

Figure 15:
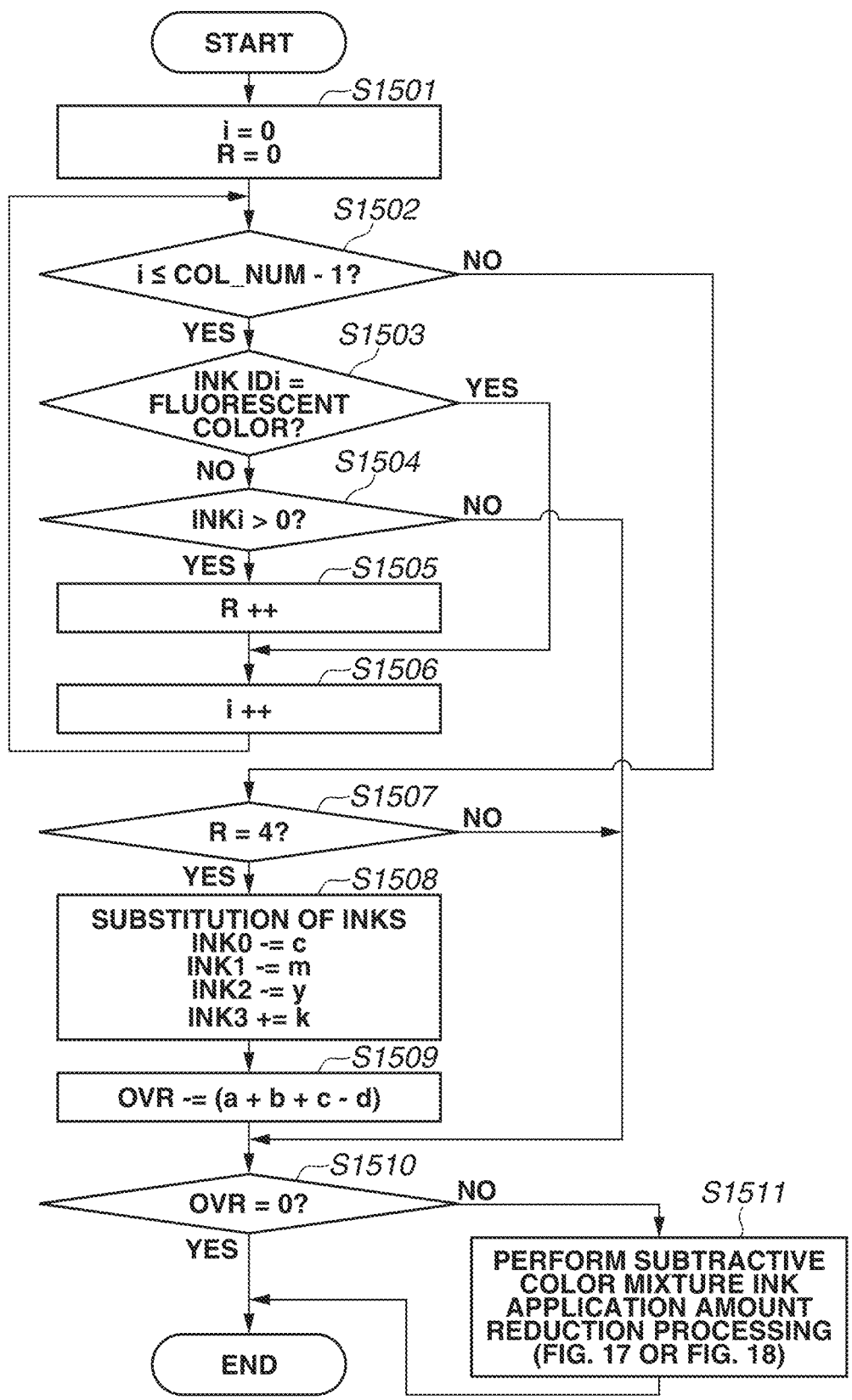
FIG. 15 is a flowchart of a third example of processing in a program for subtractive color mixture ink application amount reduction processing.

FIG. 15 is a flowchart used to explain a third example of processing for reducing the application amount of subtractive color mixture ink in step S903 in the first exemplary embodiment. In step S1501, the CPU initializes a variable i and a variable R with "0".

In step S1502, the CPU performs loop processing. The variable i functions as a loop counter. A constant COL_NUM is associated with the number of ink colors included in the recording head 405. For example, in a case where the recording head 405 is compatible with cyan, magenta, yellow, black, and fluorescent pink inks, the constant COL_NUM is "5". The loop counter i is used to perform loop processing for a number of times (COL_NUM−1). If the loop counter i is less than the constant COL_NUM (YES in step S1502), the CPU advances the processing to step S1503. If the loop counter i is greater than or equal to the constant COL_NUM (NO in step S1502), the CPU advances the processing to step S1507.

In step S1503, the CPU determines whether an ink ID corresponding to the loop counter i is fluorescent color. In the first exemplary embodiment, as illustrated in FIG. 8, the ink ID of fluorescent color is "4". If the ink ID corresponding to the loop counter i is not an ink of fluorescent color (NO in step S1503), the CPU advances the processing to step S1504, and, if the ink ID is ink of fluorescent color (YES in step S1503), the CPU advances the processing to step S1506.

In step S1504, the CPU determines whether an application amount INKi corresponding to the ink ID corresponding to the loop counter i is greater than "0". If the application amount INKi is greater than "0" (YES in step S1504), the CPU advances the processing to step S1505, and, if the application amount INKi is "0" (NO in step S1504), the CPU advances the processing to step S1510.

In step S1505, in a case where the application amount of subtractive color mixture ink is not "0", the CPU increments the variable (counter) R. In step S1506, the CPU increments the loop counter i, and then advances the processing to step S1502. In step S1507, the CPU determines whether the counter R is "4". If the counter R is "4" (YES in step S1507), it is determined that all of the application amounts of subtractive color mixture inks are greater than "0", and the CPU advances the processing to step S1508. If the counter R is other than "4" (NO in step S1507), it is determined that at least one of application amounts of subtractive color mixture inks is "0", and the CPU advances the processing to step S1510.

In step S1508, the CPU performs substitution of inks. Here, the CPU previously stores ratios for use at the time of substitution of subtractive color mixture inks, and calculates an application amount c to be subtracted from cyan ink, an application amount m to be subtracted from magenta ink, an application amount y to be subtracted from yellow ink, and an application amount k to be added to black ink. The method of determining the ratios can be a known method. Then, the CPU performs addition or subtraction of the calculated application amounts to or from the respective application amounts of subtractive color mixture inks.

In step S1509, the CPU subtracts the application amounts the reduction by which has been able to be performed by substitution of inks performed in step S1508 from a variable OVR representing an amount by which the total value of ink application amounts for a pixel of interest has exceeded the upper limit acceptable by a recording medium.

In step S1510, the CPU determines whether the variable OVR is "0". If the variable OVR is "0" (YES in step S1510), the CPU ends the processing. If the variable OVR is greater than "0" (NO in step S1510), the CPU advances the processing to step S1511. In step S1511, the CPU performs processing for subtracting the amount represented by the variable OVR from the application amount of subtractive color mixture ink. The method for the processing can be any one of the processing operations illustrated in FIG. 13 and FIG. 14 described above and in FIG. 16 described below, and is not limited to the methods described in the present specification. Moreover, while the present exemplary embodiment is described with subtractive color mixture inks CMYK taken as an example, in a case where light-color ink is mounted, substitution of light-color ink with dark-color ink can be performed. Then, in a case where gray ink is mounted, substitution of gray ink with black ink can be performed, and targets for substitution are not limited to the above-mentioned ones.

Figure 16:
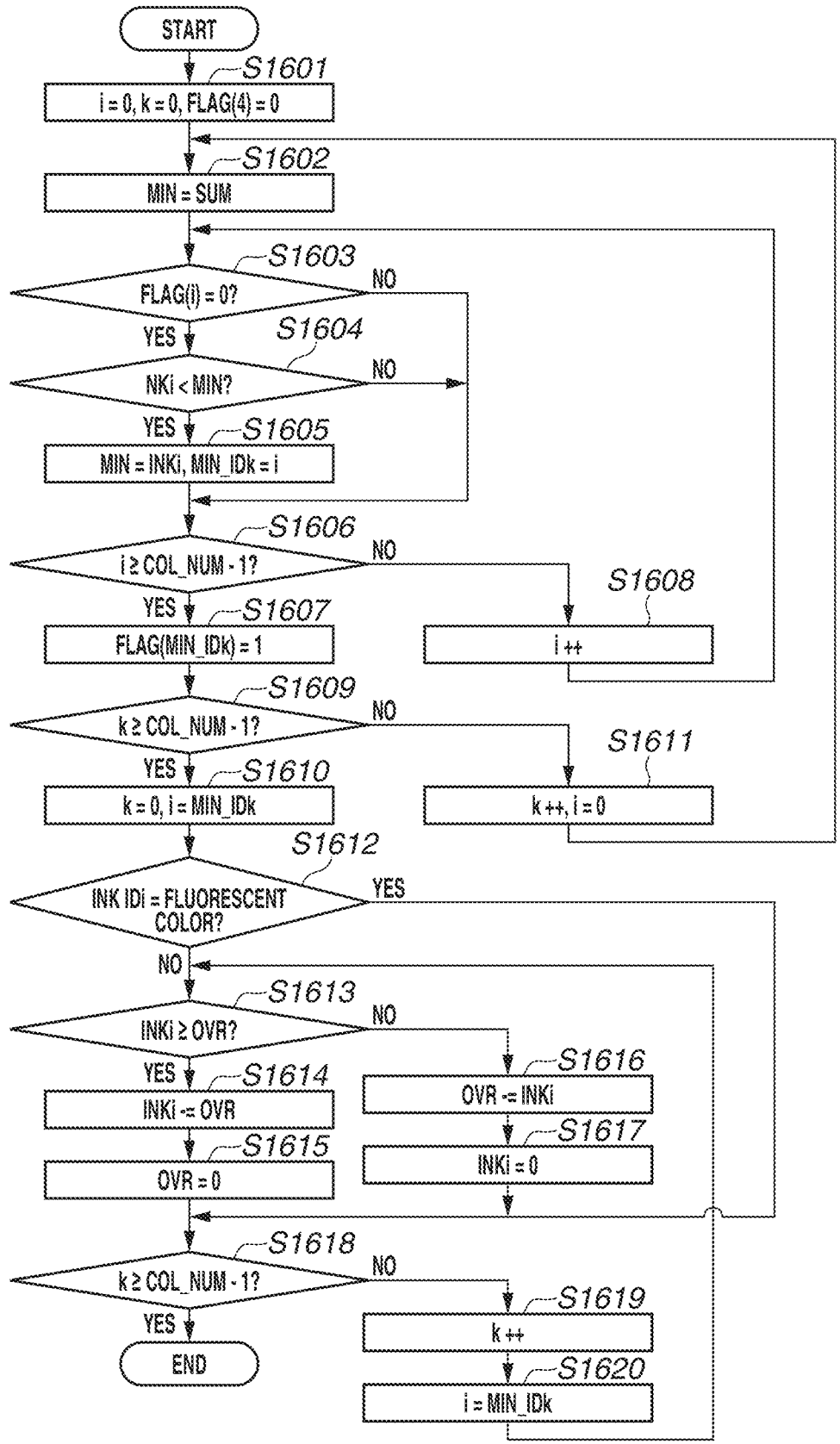
FIG. 16 is a flowchart of a fourth example of processing in a program for subtractive color mixture ink application amount reduction processing.

FIG. 16 is a flowchart used to explain a fourth example of a program for processing for subtractive color mixture ink application amount reduction processing. In step S1601, the CPU initializes a variable i, a variable k, and a variable FLAG(4) with "0". The variable i, the variable k, and the variable FLAG(4) are used at a later point in the flowchart. In step S1602, the CPU sets a total value SUM of ink application amounts for a pixel of interest to a variable MIN.

In step S1603, the CPU determines whether the variable FLAG(i) is "0". If the variable FLAG(i) is "0" (YES in step S1603), the CPU advances the processing to step S1604, and if the variable FLAG(i) is other than "0" (NO in step S1603), the CPU advances the processing to step S1606. In step S1604, the CPU determines whether an application amount INKi corresponding to an ink ID is smaller than the variable MIN. If the application amount INKi is smaller than the variable MIN (YES in step S1604), the CPU advances the processing to step S1605, and, if the application amount INKi is larger than or equal to the variable MIN (NO in step S1604), the CPU advances the processing to step S1606.

In step S1605, the CPU substitutes the value of the variable MIN with the application amount INKi and substitutes a variable MIN_IDk with the variable i. In step S1606, the CPU determines whether the loop counter i is greater than or equal to the value "(COL_NUM-1)". The variable i functions as a loop counter, and is used to perform loop processing in step S1603 to step S1605. The variable i is already initialized with "0" in step S1601. The constant COL_NUM is associated with the number of ink colors included in the recording head 405. For example, in a case where inks which are ejected from the recording head 405 are five color inks for cyan, magenta, yellow, black, and fluorescent pink, the constant COL_NUM is "5". The loop counter i is used to perform loop processing for a number of times (COL_NUM-1). If the loop counter i is greater than or equal to the value "(COL_NUM-1)" (YES in step S1606), the CPU advances the processing to step S1607. If the loop counter i is less than the value "(COL_NUM-1)" (NO in step S1606), the CPU advances the processing to step S1608.

In step S1607, the CPU sets the variable FLAG (MIN_IDk) to "1", thus causing the processing to be excluded from targets for loop processing in step S1603 to step S1605. In step S1608, the CPU increments the loop counter i, and then returns the processing to step S1603. In step S1609, the CPU determines whether the loop counter k is greater than or equal to the value "(COL_NUM-1)". The variable k functions as a loop counter, and is already initialized with "0" in step S1601. Then, the loop counter k is used to perform loop processing in step S1602 to step S1608. If the loop counter k is greater than or equal to the value "(COL_NUM-1)" (YES in step S1609), the CPU advances the processing to step S1610. If the loop counter k is less than the value "(COL_NUM-1)" (NO in step S1609), the CPU advances the processing to step S1611.

In step S1610, the CPU updates the variable k with "0". Then, the CPU sets "i=MIN_IDk". In step S1611, the CPU increments the loop counter k, updates the counter i with "0", and then returns the processing to step S1602.

The above-described processing leads to formation of a table illustrated in FIG. 17. FIG. 17 shows ranking in ascending order of application amount and ink IDs corresponding to the ranking. In the example illustrated in FIG. 17, the ranking in ascending order of application amount is set to "0" to "4", and, in the example illustrated in FIG. 17, when the ranking in ascending order of application amount is "0", an ink ID of magenta ink, which is the lowest in application amount, is set. The variable k illustrated in FIG. 16 corresponds to the ranking in ascending order of application amount, and an ink ID corresponding to the ranking in ascending order of application amount is represented by MIN_IDk.

In step S1612, the CPU determines whether the ink ID corresponding to the loop counter i is fluorescent color. In the first exemplary embodiment, as illustrated in FIG. 8, the ink ID of fluorescent color is "4". If the ink ID corresponding to the loop counter i is not fluorescent color (NO in step S1612), the CPU advances the processing to step S1613, and, if the ink ID corresponding to the loop counter i is fluorescent color (YES in step S1612), the CPU advances the processing to step S1618.

In step S1613, the CPU determines whether the application amount INKi is greater than or equal to the variable OVR, which represents an amount by which the total value of ink application amounts for a pixel of interest has exceeded the upper limit. If the ink application amount INKi is greater than or equal to the variable OVR (YES in step S1613), the CPU advances the processing to step S1614. If the ink application amount INKi is less than the variable OVR (NO in step S1613), the CPU advances the processing to step S1616.

In step S1614, the CPU subtracts the amount represented by the variable OVR from the application amount INKi corresponding to the ink ID. In step S1615, the CPU updates the variable OVR with "0". In step S1616, the CPU subtracts the application amount INKi corresponding to the ink ID from the variable OVR.

In step S1617, the CPU updates the application amount INKi corresponding to the ink ID with "0". In step S1618, the CPU determines whether the loop counter k is greater than or equal to the value "(COL_NUM-1)". If the loop counter k is greater than or equal to the value "(COL_NUM-1)" (YES in step S1618), the CPU ends the processing. If the loop counter k is less than the value "(COL_NUM-1)" (NO in step S1618), the CPU advances the processing to step S1619. In step S1619, the CPU increments the loop counter k. In step S1620, the CPU updates the variable i with the variable MIN_IDk.

Furthermore, in an example described in the first exemplary embodiment, subtractive color mixture ink is first corrected in such a manner that the total value does not exceed the upper limit, and, only in a case where the application amount has become "0" with respect to all of the subtractive color mixture inks, the application amount of fluorescent pink ink is corrected. An example in which the application amount of fluorescent pink ink is also corrected before the application amount has become "0" with respect to all of the subtractive color mixture inks is described below in a second exemplary embodiment. Then, an example in which subtractive color mixture inks are corrected after a specified amount is previously subtracted from the application amount of fluorescent pink ink is described below in a third exemplary embodiment.

In this way, in the first exemplary embodiment, processing for performing subtraction from the application amount of subtractive color mixture ink in a case where the total value of ink application amounts has exceeded the upper limit acceptable by a recording medium and not performing subtraction from the application amount of fluorescent ink until the application amount becomes "0" with respect to all of the subtractive color mixture inks is performed. This processing leads to keeping the application amount of fluorescent ink and, therefore, enables preventing a decrease in angle dependence and maintaining noticeability.

Figure 18:
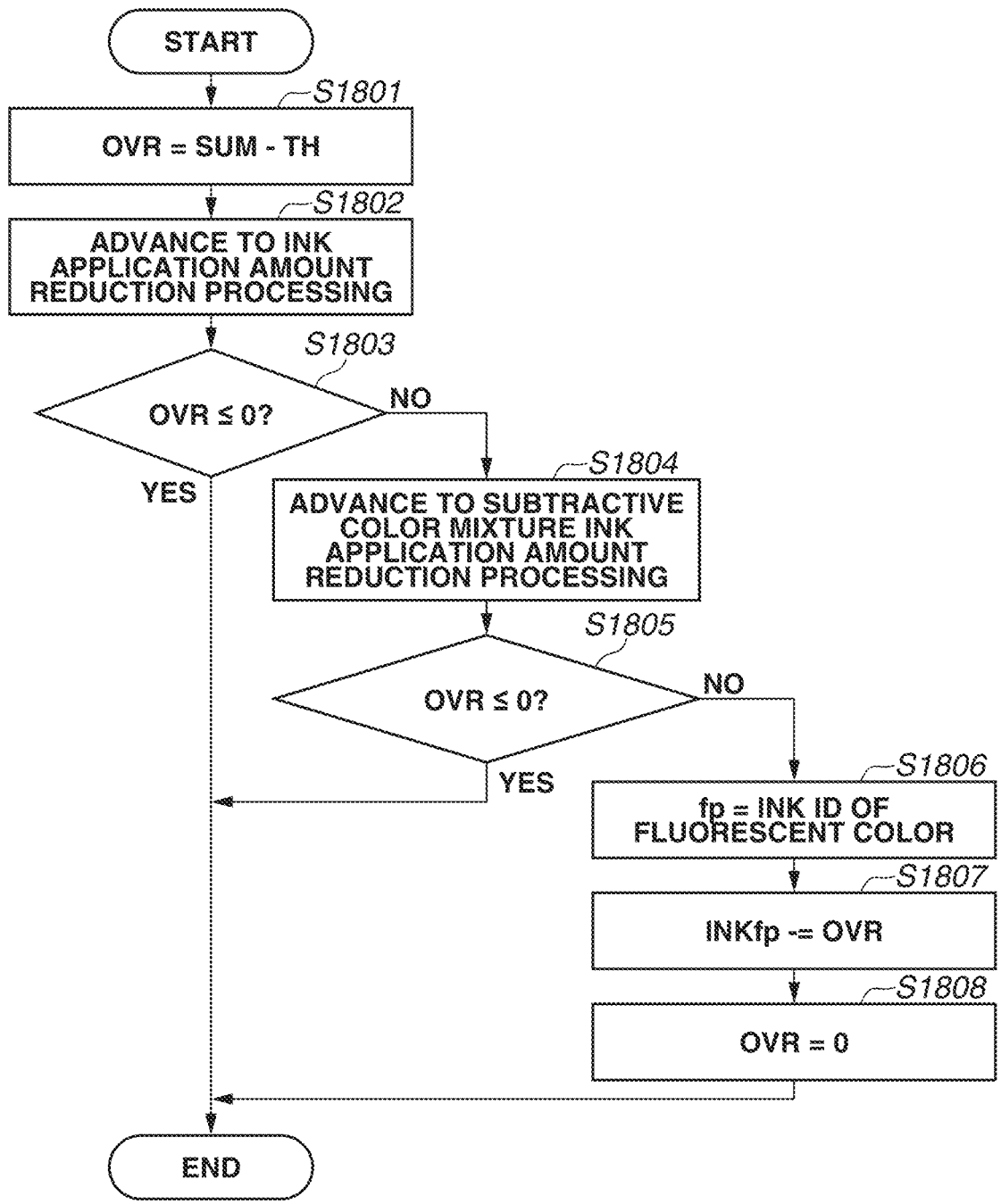
FIG. 18 is a flowchart of application amount limitation processing in a second exemplary embodiment.

FIG. 18 is a flowchart used to explain application amount limitation processing which is performed by the application amount limitation 607 in the second exemplary embodiment. A series of processing operations illustrated in FIG. 18 is performed by a CPU included in the image processing unit main control unit 411. Application amount excess determination processing which is performed by the application amount limitation 607 is similar to that illustrated in FIG. 7 and is, therefore, omitted from description here.

In step S1801, the CPU defines a variable OVR. The variable OVR is a value calculated with use of the variable SUM and the application amount excess determining threshold value TH, which are used in the flowchart of FIG. 7. Here, the value of the variable SUM reflects a result obtained by serial addition performed in step S703 in the flowchart of FIG. 7. The variable OVR represents an amount by which the total value of ink application amounts for a pixel of interest has exceeded the upper limit acceptable by a recording medium.

In step S1802, the CPU performs processing for reducing application amounts of a plurality of inks. The details of this processing is described below with reference to FIG. 19.

In step S1803, the CPU determines whether the variable OVR obtained after step S1802 is less than or equal to "0". If the variable OVR is less than or equal to "0" (YES in step S1803), the CPU determines that, due to the application amount of subtractive color mixture ink being reduced, the total value of application amounts of inks for a pixel of interest has become less than or equal to the limit value, and then ends the processing. A case where the variable OVR is greater than "0" (NO in step S1803) indicates that, even if the application amount of subtractive color mixture ink for a pixel of interest is reduced, the total value of ink application amounts has exceeded the limit value. Therefore, the CPU advances the processing to step S1804 to perform processing for reducing any remainder of the excess amount.

In step S1804, the CPU performs processing for reducing the application amount of subtractive color mixture ink and performs processing for reducing any remainder of the excess amount with subtractive color mixture ink. The CPU performs any one of the methods described with reference to FIG. 13 to FIG. 16 in the first exemplary embodiment. However, the reduction processing is not limited to the above-mentioned methods.

In step S1805, the CPU determines whether the variable OVR obtained after step S1804 is less than or equal to "0". If the variable OVR is less than or equal to "0" (YES in step S1805), the CPU determines that the remaining excess application amount has been able to be reduced with subtractive color mixture ink by the processing in step S1804, and ends the processing. On the other hand, if the variable OVR is greater than "0" (NO in step S1805), the CPU determines that the remaining excess application amount has not been able to be reduced with subtractive color mixture ink, and advances the processing to step S1806.

In step S1806, the CPU acquires an ink ID of fluorescent color and then stores the acquired ink ID in a variable fp. In step S1807, the CPU subtracts the remainder of the excess amount from the application amount INKfp of fluorescent color ink. In step S1808, the CPU updates the variable OVR with "0", and then ends the processing.

Furthermore, in the present processing, processing for, before step S1807, determining whether the application amount INKfp of fluorescent color ink is greater than the variable OVR is not included, but can be added.

Figure 19:
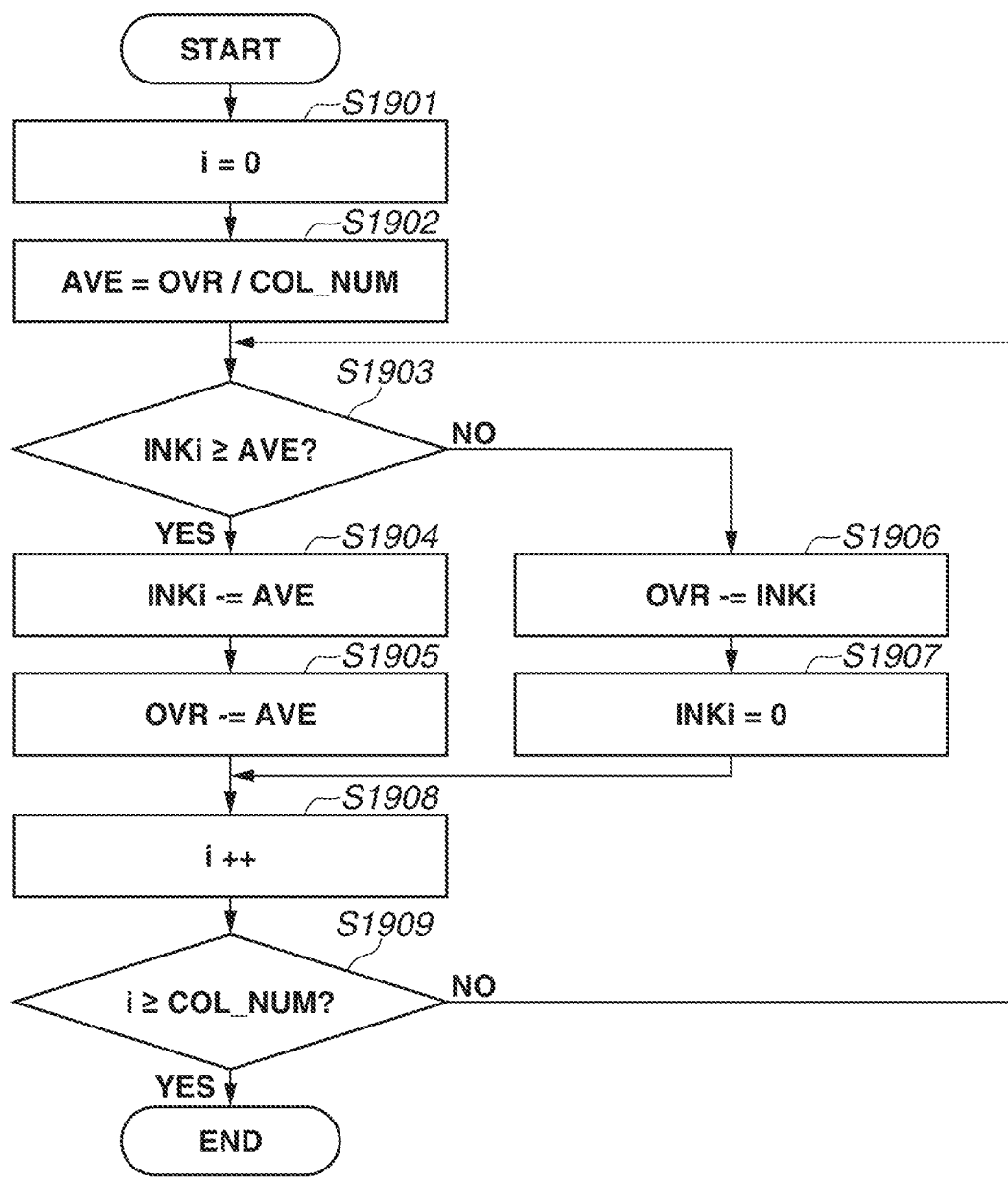
FIG. 19 is a flowchart of ink application amount reduction processing in the second exemplary embodiment.

FIG. 19 is a flowchart illustrating processing for reducing ink application amounts, to which the processing is advanced from step S1802. In step S1901, the CPU initializes a variable i, which functions as a loop counter, with "0". In step S1902, the CPU divides a variable OVR, which is an amount by which the total value of ink application amounts for a pixel of interest has exceeded the upper limit acceptable by a recording medium by a constant COL_NUM, which is the number of inks mounted in the recording apparatus, and assigns a result of the division to a variable AVE.

In step S1903, the CPU determines whether the application amount INKi corresponding to the ink ID is greater than or equal to the variable AVE calculated in step S1902. If the application amount INKi corresponding to the ink ID is greater than or equal to the variable AVE (YES in step S1903), the CPU advances the processing to step S1904, and, if the application amount INKi corresponding to the ink ID is less than the variable AVE (NO in step S1903), the CPU advances the processing to step S1906.

In step S1904, the CPU subtracts the variable AVE from the application amount INKi corresponding to the ink ID. In step S1905, the CPU subtracts the variable AVE from the variable OVR, which is an amount by which the total value of ink application amounts for a pixel of interest has exceeded the upper limit, thus updating the remainder of the excess amount. In step S1906, the CPU subtracts the application amount INKi corresponding to the ink ID from the variable OVR, which is an amount by which the total value of ink application amounts for a pixel of interest has exceeded the upper limit.

In step S1907, the CPU assigns "0" to the application amount INKi corresponding to the ink ID.

In step S1908, the CPU increments the loop counter i. In step S1909, the CPU determines whether the loop counter i is greater than or equal to the constant COL_NUM. The loop counter i is already initialized with "0" in step S1901. The constant COL_NUM is associated with the number of ink colors included in the recording head 405. For example, in a case where the recording head 405 is compatible with cyan, magenta, yellow, black, and fluorescent pink inks, the constant COL_NUM is "5". The loop counter i is used to perform step S1903 to step S1908 as loop processing for a number of times (COL_NUM−1). If the loop counter i is less than the constant COL_NUM (NO in step S1909), the CPU advances the processing to step S1903. If the loop counter i is greater than or equal to the constant COL_NUM (YES in step S1909), the CPU ends the processing.

In the second exemplary embodiment, as in step S1902, the excess amount is divided by the number of ink colors to reduce the application amounts of respective color inks in an equal manner, so that the ratio of ink application amounts corresponding to original image data is kept as much as possible and a change in color difference is prevented or reduced. To reduce a density difference from the original ink application amounts, a method of performing reduction starting with light-color ink can be employed, or a method of substituting light-color ink with dark-color ink can be employed. Moreover, for example, under color removal (UCR), which is a known method, can be used to substitute cyan ink, magenta ink, and yellow ink with black ink, and the second exemplary embodiment is not limited to the above-mentioned methods.

Figure 20:
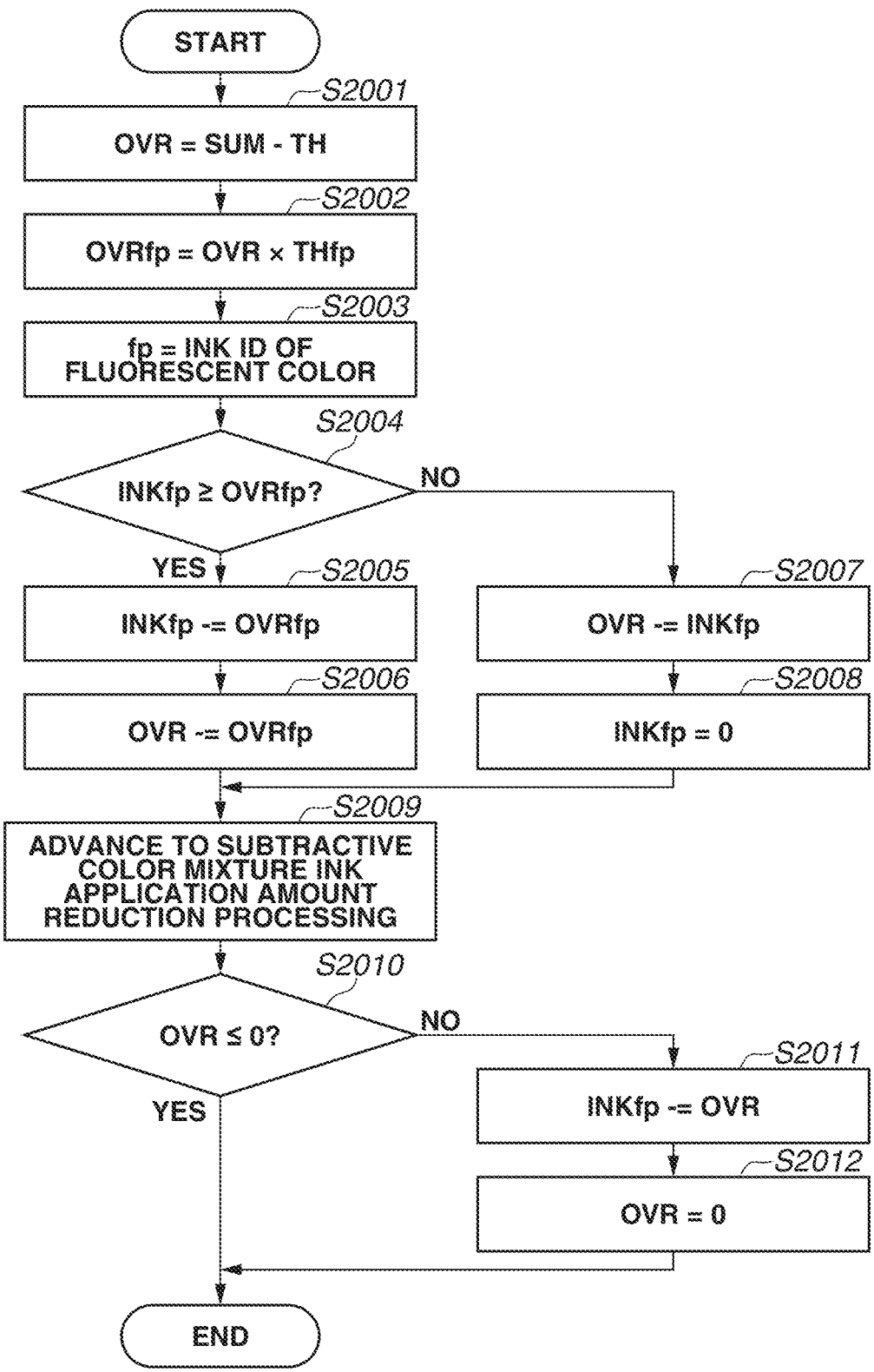
FIG. 20 is a flowchart of application amount limitation processing in a third exemplary embodiment.

FIG. 20 is a flowchart used to explain application amount limitation processing which is performed by the application amount limitation 607 in the third exemplary embodiment. The third exemplary embodiment is directed to processing for, with respect to an amount by which the total value of ink application amounts for a pixel of interest has exceeded the upper limit, calculating an amount by which to reduce the application amount of fluorescent color ink based on a threshold value TH described below, subtracting the calculated amount from the application amount of fluorescent color ink, and then subtracting the remainder of subtraction from the application amount of subtractive color mixture ink. Therefore, the present processing is processing for subtracting application amounts from fluorescent ink and at least one of subtractive color mixture inks. A series of processing operations illustrated in FIG. 20 is performed by a CPU included in the image processing unit main control unit 411. Application amount excess determination processing which is performed by the application amount limitation 607 is similar to that illustrated in FIG. 7 and is, therefore, omitted from description here.

In step S2001, the CPU defines a variable OVR. The variable OVR is a value calculated with use of the variable SUM and the application amount excess determining threshold value TH, which are used in the flowchart of FIG. 7. Here, the value of the variable SUM reflects a result obtained by serial addition performed in step S703 in the flowchart of FIG. 7. The variable OVR represents an amount by which the total value of ink application amounts for a pixel of interest has exceeded the upper limit acceptable by a recording medium.

In step S2002, the CPU calculates an amount OVRfp, which is an amount to be reduced from the application amount of fluorescent color ink. The amount OVRfp is calculated by multiplying the variable OVR by a threshold value THfp, which specifies a ratio at which to reduce the application amount of fluorescent color ink. While, under the assumption that the smallest combination of subtractive color mixture inks CMY and fluorescent ink are mounted in a color recording apparatus, it is favorable that the setting value of the threshold value THfp is less than or equal to 25%, if an amount by which to reduce the application amount of fluorescent ink is less than an amount by which to reduce the application amount of subtractive color mixture ink, the setting value of the threshold value THfp is not limited to less than or equal to 25%.

In step S2003, the CPU acquires an ink ID of fluorescent color and stores the ink ID of fluorescent color in a variable fp. In step S2004, the CPU determines whether the application amount INKfp of fluorescent color ink is greater than or equal to the amount OVRfp, which is an amount to be reduced from the application amount of fluorescent color ink, calculated in step S2002.

If the application amount INKfp of fluorescent color ink is greater than or equal to the amount OVRfp (YES in step S2004), the CPU advances the processing to step S2005. On the other hand, if the application amount INKfp of fluorescent color ink is less than the amount OVRfp (NO in step S2004), the CPU advances the processing to step S2007.

In step S2005, the CPU subtracts the amount OVRfp, which is an amount to be reduced from the application amount of fluorescent color ink, from the application amount INKfp of fluorescent color ink. In step S2006, the CPU subtracts the amount OVRfp, which is an amount to be reduced from the application amount of fluorescent color ink, from the variable OVR, which represents an amount by which the total value of ink application amounts for a pixel of interest has exceeded the upper limit acceptable by a recording medium. In step S2007, the CPU subtracts the application amount INKfp of fluorescent color ink from the variable OVR, which represents an amount by which the total value of ink application amounts for a pixel of interest has exceeded the upper limit acceptable by a recording medium.

In step S2008, the CPU updates the application amount INKfp of fluorescent color ink with "0". In step S2009, the CPU performs processing for reducing the application amount of subtractive color mixture ink. Here, the CPU performs processing for offsetting the remainder of the excess amount by reducing the application amount of subtractive color mixture ink. The processing details thereof can be employed from among those illustrated in FIG. 13 to FIG. 16 in the first exemplary embodiment.

In step S2010, the CPU determines whether the variable OVR is less than or equal to "0". If the variable OVR is less than or equal to "0" (YES in step S2010), the CPU ends the processing. If the variable OVR is greater than "0" (NO in step S2010), the CPU determines that the remainder of the excess application amount has not been able to be reduced with subtractive color mixture ink, and then advances the processing to step S2011.

In step S2011, the CPU performs processing for subtracting the remainder of the excess amount from the application amount INKfp of fluorescent color ink. In step S2012, the CPU updates the variable OVR with "0", and then ends the processing.

In the present processing, processing for, before step S2011, determining whether the application amount INKfp of fluorescent color ink is greater than or equal to the variable OVR is not included, but can be added.

In this way, in the third exemplary embodiment, in a case where the total value of ink application amounts has exceeded the upper limit of the ink application amount acceptable by a recording medium, the application amount of fluorescent ink is first reduced to a given amount. After that, the remainder of the excess amount from the upper limit is reduced from the application amount of subtractive color mixture ink. Here, an amount by which to first reduce the application amount of fluorescent ink is smaller than an amount by which to reduce the application amount of subtractive color mixture ink. As a result, it is possible to prevent or reduce a change in color difference and keep noticeability. Moreover, because of the application amount of fluorescent ink being first reduced, it is possible to reduce the amount of time for loop processing for performing reduction starting with subtractive color mixture ink and to enhance the speed of processing.

In the above-described exemplary embodiments, in the flowcharts of FIGS. 9, 13-16, and 18-20, an excess amount by which the total value of ink application amounts has exceeded the upper limit acceptable by a recording medium is calculated. The method for calculating the excess amount is not limited to those described in the above-described exemplary embodiments.

Reduction can be performed starting with subtractive color mixture ink, which is used for recording after fluorescent ink. Furthermore, while, in the above-described exemplary embodiments, fluorescent ink is used as ink low in angle dependence and subtractive color mixture ink is used as ink high in angle dependence, the above-described exemplary embodiments are not limited to this. Moreover, even in a case where ink relatively high in angle dependence and ink relatively low in angle dependence are used, if ink low in angle dependence is used as a fluorescent ink equivalent and ink high in angle dependence is used as a subtractive color mixture ink equivalent, it is possible to obtain the advantage of keeping noticeability, as with the above-described exemplary embodiments.

Moreover, while, in the above-described exemplary embodiments, processing in the application amount limitation 607 is performed based on a color signal including elements of five color inks (C, M, Y, K, and P), the excess amount can be acquired from a color signal including elements of color inks (R, G, B, and P). In this case, an excess amount corresponding to each combination of values of respective elements of color inks (R, G, B, and P) can be previously stored. This can be implemented by using a look-up table for outputting each excess amount with respect to inputs of (R, G, B, and P), and, as the number of grid points of the look-up table is made larger, precision can be enhanced. Furthermore, processing for preferentially reducing the application amount of ink low in angle dependence based on the excess amount can be performed in the same manner as that in the third exemplary embodiment.

Furthermore, while, in the above-described exemplary embodiments, subtractive color mixture inks of four colors C, M, Y, and K are used as inks of basic colors, the number of ink colors is not limited, and at least one basic color ink can be included.

Moreover, while, in the above-described exemplary embodiments, an example in which each processing flow is performed by a CPU included in the image processing unit main control unit 411 has been described, a configuration in which a part of the processing is performed by a CPU included in the recording unit main control unit 403 can be employed. Each CPU may comprise one or more of a processor, circuitry, or combinations thereof. Moreover, a configuration in which a program for each processing flow is read out from a storage medium storing the program and is then executed by a computer can also be employed.

According to aspects of the present disclosure, it is possible to, while preventing or reducing overflow on a recording medium, prevent or reduce a decrease in noticeability in an image for recording.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors, circuitry, or combinations thereof (e.g., central processing unit (CPU), micro processing unit (MPU)), and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2022-127573 filed Aug. 10, 2022, which is hereby incorporated by reference herein in its entirety.

What is claimed is:

1. An image processing apparatus comprising at least one processor configured to:
    acquire, with respect to a pixel of interest, a combination of a plurality of pixel values representing respective ink application amounts of a plurality of color inks including at least one basic color ink and a first fluorescent ink containing a dispersion element having a fluorescent property;
    determine whether a total value of the plurality of pixel values is larger than a threshold value;
    reduce, in a case where it is determined that the total value is larger than the threshold value, a first pixel value for at least one ink of the at least one basic color ink so an amount by which to reduce a second pixel value for the first fluorescent ink becomes smaller than an amount by which to reduce the first pixel value corresponding to the at least one ink of the at least one basic color ink; and
    apply the plurality of color inks to a recording medium so that an image is recorded on the recording medium.

2. The image processing apparatus according to claim 1, wherein the at least one processor is further configured to set the threshold value based on at least one of type information indicating a type of recording medium on which an image is to be recorded and quality information indicating a recording quality of an image.

3. The image processing apparatus according to claim 1, wherein the basic color ink is an ink which absorbs light of a predetermined specific wavelength and includes a color material which is not luminous.

4. The image processing apparatus according to claim 1, wherein the plurality of color inks includes cyan ink, magenta ink, and yellow ink as basic color inks.

5. The image processing apparatus according to claim 4, wherein the plurality of color inks further includes black ink.

6. The image processing apparatus according to claim 4, wherein the plurality of color inks further includes at least one of light cyan ink or light magenta ink.

7. The image processing apparatus according to claim 1, wherein the at least one processor is further configured to acquire a third pixel value indicating an application amount of the at least one basic color ink and a fourth pixel value indicating an application amount of the first fluorescent ink.

8. The image processing apparatus according to claim 7, wherein the at least one processor is further configured to generate a color signal which includes the third pixel value for the at least one basic color ink and does not include the fourth pixel value for the first fluorescent ink and to input the generated color signal to the image processing apparatus.

9. The image processing apparatus according to claim 8, wherein a total value of pixel values included in the generated color signal is less than or equal to the threshold value.

10. The image processing apparatus according to claim 8, wherein the at least one processor is further configured to calculate, the total value, a total of pixel values included in the generated color signal and the fourth pixel value for the first fluorescent ink.

11. The image processing apparatus according to claim 1, wherein the at least one processor is further configured to acquire the combination for each pixel corresponding to a unit area on a recording medium, and
wherein at least one processor is further configured to perform determination and reduction with respect to each pixel for which the combination has been acquired.

12. The image processing apparatus according to claim 1, wherein the plurality of color inks further includes a second fluorescent ink different in color from the first fluorescent ink, and
wherein an amount by which to reduce a third pixel value for the second fluorescent ink is larger than an amount by which to reduce the first pixel value for the at least one ink of the at least one basic color ink.

13. An image processing method comprising:
acquiring, with at least one processor, with respect to a pixel of interest, a combination of a plurality of pixel values representing respective ink application amounts of a plurality of color inks including at least one basic color ink and a fluorescent ink containing a dispersion element having a fluorescent property;
determining with the at least one processor, whether a total value of the plurality of pixel values is larger than a threshold value; and
in a case where it is determined that the total value is larger than the threshold value, reducing, with the at least one processor, a first pixel value for at least one ink of the at least one basic color ink so that an amount by which to reduce a second pixel value for the fluorescent ink becomes smaller than an amount by which to reduce the first pixel value corresponding to at least one ink of the at least one basic color ink and
applying, with the at least one processor, the plurality of color inks to a recording medium so that an image is recorded on the recording medium.

14. A non-transitory computer-readable storage medium storing computer-executable instructions that, when executed by a computer, cause the computer to perform an image processing method comprising:
acquiring, with at least one processor, with respect to a pixel of interest, a combination of a plurality of pixel values representing respective ink application amounts of a plurality of color inks including at least one basic color ink and a fluorescent ink containing a dispersion element having a fluorescent property;
determining, with the at least one processor, whether a total value of the plurality of pixel values is larger than a threshold value; and
in a case where it is determined that the total value is larger than the threshold value, reducing, with the processor, a first pixel value for at least one ink of the at least one basic color ink so that an amount by which to reduce a second pixel value for the fluorescent ink becomes smaller than an amount by which to reduce the first pixel value corresponding to at least one ink of the at least one basic color ink; and
applying, with the at least one processor, the plurality of color inks to a recording medium so that an image is recorded on the recording medium.

15. An image processing apparatus comprising at least one processor configured to:
acquire, with respect to a pixel of interest, a combination of a plurality of pixel values including a first pixel value indicating an application amount of a first ink and a second pixel value indicating an application amount of a second ink higher in angle dependence than the first ink;
determine whether a total value of the plurality of pixel values is larger than a threshold value;
in a case where it is determined that the total value is larger than the threshold value, perform reduction so that an amount by which to reduce the second pixel value for the second ink becomes smaller than an amount by which to reduce the first pixel value for the first ink; and
apply the plurality of color inks to a recording medium so that an image is recorded on the recording medium.

16. The image processing apparatus according to claim 15, wherein the second ink is smaller in a change of reflection intensity depending on an angle of light received from a recording medium than the first ink.

17. The image processing apparatus according to claim 15, wherein the amount by which to reduce a pixel value for the second ink is "0".

18. The image processing apparatus according to claim 15, wherein the amount by which to reduce a pixel value for the second ink is larger than "0".

* * * * *